(12) United States Patent
Raman et al.

(10) Patent No.: US 10,261,831 B2
(45) Date of Patent: Apr. 16, 2019

(54) SPECULATIVE LOOP ITERATION PARTITIONING FOR HETEROGENEOUS EXECUTION

(71) Applicant: QUALCOMM Incorporated, San Diego, CA (US)

(72) Inventors: Arun Raman, San Francisco, CA (US); Han Zhao, Santa Clara, CA (US); Aravind Natarajan, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 167 days.

(21) Appl. No.: 15/245,604

(22) Filed: Aug. 24, 2016

(65) Prior Publication Data

US 2018/0060130 A1 Mar. 1, 2018

(51) Int. Cl.
*G06F 9/46* (2006.01)
*G06F 9/50* (2006.01)

(52) U.S. Cl.
CPC .......... *G06F 9/5027* (2013.01); *G06F 9/5066* (2013.01); *G06F 2209/5017* (2013.01)

(58) Field of Classification Search
CPC ..................................................... G06F 9/5027
See application file for complete search history.

(56) References Cited

U.S. PATENT DOCUMENTS

| 7,694,107 | B2* | 4/2010 | Lin | ........................ | G06F 9/5044 |
| | | | | | 712/28 |
| 2005/0267898 | A1* | 12/2005 | Simon | .................... | G01D 4/002 |
| 2008/0195847 | A1 | 8/2008 | Wu et al. | | |
| 2010/0031003 | A1 | 2/2010 | Chen et al. | | |
| 2010/0274972 | A1 | 10/2010 | Babayan et al. | | |
| 2012/0167069 | A1* | 6/2012 | Lin | ........................ | G06F 8/456 |
| | | | | | 717/160 |
| 2012/0278586 | A1 | 11/2012 | Caufield et al. | | |
| 2017/0118293 | A1* | 4/2017 | Bridger | .................. | H04L 67/10 |

FOREIGN PATENT DOCUMENTS

WO 2016007430 A1 1/2016

OTHER PUBLICATIONS

International Search Report and Written Opinion—PCT/US2017/043648—ISA/EPO—dated Nov. 10, 2017.

(Continued)

*Primary Examiner* — Emerson C Puente
*Assistant Examiner* — Steven M Do
(74) *Attorney, Agent, or Firm* — The Marbury Law Group/Qualcomm

(57) ABSTRACT

Embodiments include computing devices, apparatus, and methods implemented by the apparatus for implementing speculative loop iteration partitioning (SLIP) for heterogeneous processing devices. A computing device may receive iteration information for a first partition of iterations of a repetitive process and select a SLIP heuristic based on available SLIP information and iteration information for the first partition. The computing device may determine a split value for the first partition using the SLIP heuristic, and partition the first partition using the split value to produce a plurality of next partitions.

30 Claims, 9 Drawing Sheets

(56) References Cited

OTHER PUBLICATIONS

Baier A., "Automatic Loop Partitioning for Heterogeneous Systems," KIT—University of the State of Baden-Wuerttemberg and National Research Center of the Helmholtz Association, Aug. 15, 2015-Jan. 14, 2016, 54 pages.

Krolik A., et al., "Asymmetric Partitioning in Thread-Level Speculation," Sable Technical Report No. sable-2015-2, Nov. 2015, 20 pages.

* cited by examiner

SPECULATIVE LOOP ITERATION PARTITIONING FOR HETEROGENEOUS EXECUTION

BACKGROUND

Heterogeneous computing can be used to split work over multiple heterogeneous processing devices, such as a central processing unit (CPU) and various kinds of accelerators, to reduce processing time and power consumption for the work. Due to variability among the heterogeneous processing devices, balancing the work across the heterogeneous processing devices to achieve a desired efficiency for executing the work is tricky. Heterogeneous processing devices can be assigned segments of work of a larger set of work. Some heterogeneous processing devices can complete the same amount of work or more work in less time than other heterogeneous processing devices. The heterogeneous processing devices that finish the assigned segments of work before the larger set of work is completed can end up waiting until the remaining segments of work being executed by the other heterogeneous processing devices are completed.

SUMMARY

The methods and apparatuses of various embodiments provide apparatuses and methods for implementing speculative loop iteration partitioning (SLIP) for heterogeneous processing devices. Various embodiments may include receiving iteration information for a first partition of iterations of a repetitive process and selecting a SLIP heuristic based on available SLIP information and iteration information for the first partition. Some embodiments may further include determining a split value for the first partition using the SLIP heuristic, and partitioning the first partition using the split value to produce a plurality of next partitions.

Some embodiments may further include determining whether execution of a second partition of iterations of the repetitive process is complete, in which selecting a SLIP heuristic based on available SLIP information and iteration information for the first partition may occur in response to determining that execution of the second partition is complete.

Some embodiments may further include receiving a request for work, in which selecting a SLIP heuristic based on available SLIP information and iteration information for the first partition may occur in response to receiving the request for work.

In some embodiments, receiving iteration information for a first partition of iterations of a repetitive process may include receiving a current iteration for the first partition. In such embodiments, determining a split value for the first partition using the SLIP heuristic may include determining the split value between the current iteration of the first partition and an unexecuted iteration of the first partition furthest from the current iteration.

In some embodiments, selecting a SLIP heuristic based on available SLIP information and iteration information for the first partition may include selecting a tracker SLIP heuristic using a modified version of a uniform SLIP heuristic. In some embodiments, determining the split value between the current iteration of the first partition and an unexecuted iteration of the first partition furthest from the current iteration may include determining the split value evenly between the current iteration of the first partition and the unexecuted iteration of the first partition furthest from the current iteration.

In some embodiments, the available SLIP information may include heterogeneous processing device characteristics. In some embodiments, selecting a SLIP heuristic based on available SLIP information and iteration information for the first partition may include selecting a tracker SLIP heuristic using a modified version of a prediction SLIP heuristic. In some embodiments, determining the split value between the current iteration of the first partition and an unexecuted iteration of the first partition furthest from the current iteration may include determining the split value between the current iteration of the first partition and the unexecuted iteration of the first partition furthest from the current iteration proportionate to the heterogeneous processing device characteristics of a first heterogeneous processing device and a second heterogeneous processing device relative to each other.

In some embodiments, the available SLIP information may include partition execution performance data by a first heterogeneous processing device and a second heterogeneous processing device for the repetitive process. In some embodiments, selecting a SLIP heuristic based on available SLIP information and iteration information for the first partition may include selecting a tracker SLIP heuristic using a modified version of a historical SLIP heuristic. In some embodiments, determining the split value may include determining the split value between the current iteration of the first partition and the unexecuted iteration of the first partition furthest from the current iteration so that the split value is proportionate to a value of the partition execution performance data by the first heterogeneous processing device and the second heterogeneous processing device relative to each other.

In some embodiments, the plurality of next partitions may include a first next partition and a second next partition. Some embodiments may further include assigning the first next partition to a first heterogeneous processing device for execution, in which the first heterogeneous processing device was previously assigned the first partition. Such embodiments may further include selecting a second heterogeneous processing device in response to one of determining that execution of a second partition of iterations of the repetitive process executed by the second heterogeneous processing device is complete, determining that the second heterogeneous processing device is executing the first partition, receiving a request for work from the second heterogeneous processing device, and using available SLIP information relating to the second heterogeneous processing device for selecting the SLIP heuristic based on the available SLIP information and the iteration information for the first partition. Such embodiments may further include assigning the second next partition to the second heterogeneous processing device for execution.

Various embodiments may include a SLIP controller configured to implement SLIP on a computing device for heterogeneous processing devices. The SLIP controller may be configured to perform operations of the embodiment methods summarized above.

Various embodiments may include a SLIP controller configured to implement SLIP on a computing device for heterogeneous processing devices, the SLIP controller having means for performing functions of the embodiment methods summarized above.

Various embodiments may include a non-transitory processor-readable storage medium having stored thereon processor-executable instructions configured to cause a processor of a computing device to perform operations of the embodiment methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

DETAILED DESCRIPTION

Figure 1:
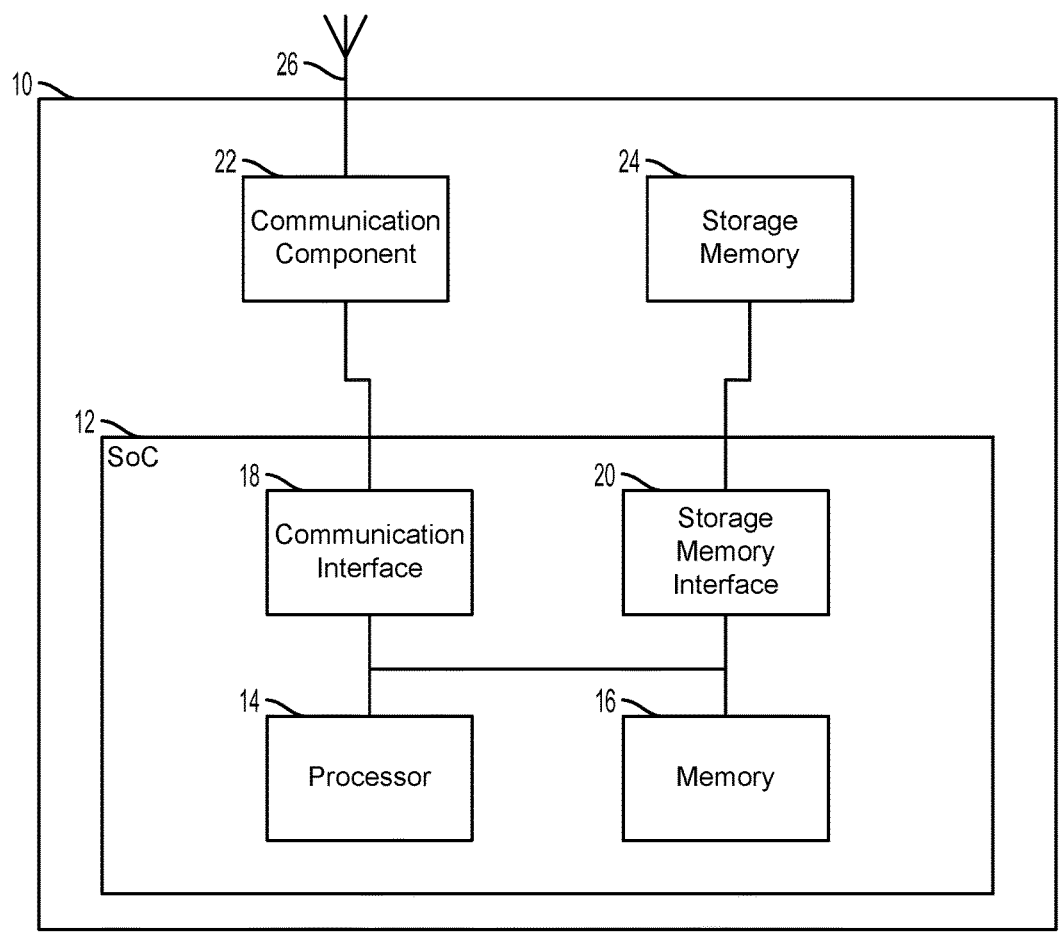
FIG. 1 is a component block diagram illustrating a computing device suitable for implementing an embodiment.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

The terms "computing device" and "mobile computing device" are used interchangeably herein to refer to any one or all of cellular telephones, smartphones, personal or mobile multi-media players, personal data assistants (PDA's), laptop computers, tablet computers, convertible laptops/tablets (2-in-1 computers), smartbooks, ultrabooks, netbooks, palm-top computers, wireless electronic mail receivers, multimedia Internet enabled cellular telephones, mobile gaming consoles, wireless gaming controllers, and similar personal electronic devices that include a memory, and a programmable processor. The term "computing device" may further refer to stationary computing devices including personal computers, desktop computers, all-in-one computers, workstations, super computers, mainframe computers, embedded computers, servers, home theater computers, and game consoles.

Various embodiments include methods, and systems and devices implementing such methods for reducing synchronization requirements for dynamically partitioning partitions of an iteration space for a repetitive process being executed by heterogeneous processing devices. The apparatus and methods may include a speculative loop iteration partitioning (SLIP) controller configured to dynamically partition the iteration space using a SLIP heuristic for execution by multiple heterogeneous processing devices, tracking progress of the heterogeneous processing devices executing their iterations of the partitions, and partitioning a partition in response to a heterogeneous processing device completing the iterations of its partition.

A SLIP controller may be configured to implement partitioning of iteration spaces for repetitive processes using one or more SLIP heuristics. Iteration spaces partitioned by a SLIP heuristic may include iteration subspaces that are partitions of a larger iteration space. A uniform SLIP heuristic may partition an iteration space according to the number of iterations of the iteration space divided evenly among a number of heterogeneous processing devices. A prediction SLIP heuristic may partition an iteration space according to relative processing capabilities of the heterogeneous processing devices. For example, the relative processing capabilities of the heterogeneous processing devices may be expressed as a ratio of the processing capabilities of the heterogeneous processing devices, and the partitions of the iteration space may correspond in numbers of iterations to the ratio. A historical SLIP heuristic may partition an iteration space according to recorded performance of prior executions of partitions of an iteration space, or according to prior partitions used for the same repetitive process. For example, poor performance of a prior execution of the partitions of the iteration space may prompt a change in the partitions to provide more iterations to better performing heterogeneous processing devices. Similarly, adequate performance of a prior execution of the partitions of the iterations space may prompt repeated use of the partitions. A tracker SLIP heuristic may partition partitions of an iteration space according to a current iteration of a partition being executed using any of the uniform SLIP heuristic, the prediction SLIP heuristic, or the historical SLIP heuristic.

The different SLIP heuristics may be associated with a level of confidence for partitioning iteration spaces. The uniform SLIP heuristic may be associated with the lowest level of confidence of the SLIP heuristics, the prediction SLIP heuristic may be associated with a higher level of confidence than the uniform SLIP heuristic, and the historical SLIP heuristic may be associated with a higher level of confidence than the prediction SLIP heuristic. The tracker SLIP heuristic may be generally associated with the highest level of confidence with increasing confidence based on the confidence levels of the other SLIP heuristics used by the tracker SLIP heuristic.

The SLIP controller may create partitions at splits between iterations of the iteration space. An initial split may partition the iteration space prior to execution of the iterations, creating initial partitions. The number of initial splits may be one less than the number of heterogeneous processing devices to which the initial partitions are assigned. Initial splits may be created using any of the uniform SLIP heuristic, the prediction SLIP heuristic, or the historical SLIP heuristic. The initial split may not be ideal. In other words, the initial splits may create initial partitions for which execution is not completed at the same time or close enough in time that the SLIP controller could not further partition a first initial partition upon completion of a second initial partition. Continued refinement of splits of the iteration space for a repetitive process by the SLIP controller may increasingly approach ideal splits.

A first heterogeneous processing device finishing execution of its assigned partition may continue on to execute iterations of another partition assigned to a second heterogeneous processing device. For heterogeneous processing devices sharing an output buffer, heterogeneous processing devices may attempt to write the outputs from executions of the overlapping iterations to the shared output buffer. For example, the first heterogeneous processing device may write the output of a first execution of the overlapping iteration to the shared buffer after the second heterogeneous processing device has written the output of a second execution of the overlapping iteration to the shared buffer. The later write of the output of the first execution of the overlapping iteration to the shared output buffer by the first heterogeneous processing device may overwrite the output of the second execution of the overlapping iteration by the second heterogeneous processing device written to the shared buffer. For heterogeneous processing devices that have dedicated output buffers, after completion of the initial partitions, the output buffers may be merged. Various merging policies may create a merged output using an output of an execution of the overlap iteration by the first heterogeneous processing device or the second heterogeneous processing device, or using only outputs from the executions of the initial partitions of the first heterogeneous processing device and the second heterogeneous processing device.

In various implementations, the SLIP controller may be informed of and/or may check if a heterogeneous computing device is executing an iteration outside of its initial partition, signifying that an initial partition is completed. Completion of the initial partition may signify that the heterogeneous processing device that was executing the initial partition is available to execute more iterations. The SLIP controller may use any of the uniform SLIP heuristic, the prediction SLIP heuristic, or the historical SLIP heuristic to create a split in an initial partition that is still being executed, by using the split values that created the initial partition as the iteration space, creating a first next partition and a second next partition. The heterogeneous computing device that was still executing the initial partition may be assigned the first next partition for execution and the heterogeneous computing device that completed its initial partition may be assigned the second next partition for execution. In various implementations, the SLIP controller may be informed of and/or may check for a current iteration in an initial partition that a heterogeneous computing device is executing. The SLIP controller may use the tracker SLIP heuristic to create a split in the initial partition that is still being executed, by using the split value that created the initial partition and that is closest to an unexecuted iteration of the initial partition and the current iteration as the iteration space, creating a first next partition and a second next partition. The first next partition and the second next partition may each contain a different set of iterations of the initial partition assigned to the heterogeneous computing device that was still executing the initial partition. The heterogeneous computing device that was still executing the initial partition may be assigned the first next partition for execution and the heterogeneous computing device that completed its initial partition may be assigned the second next partition for execution.

In various implementations, the SLIP controller may be informed of completion of an initial partition by a heterogeneous computing device that completed its initial partition. In various implementations, the SLIP controller may use any of the uniform SLIP heuristic, the prediction SLIP heuristic, or the historical SLIP heuristic to create a split in an initial partition that is still being executed. The SLIP controller may do so by using the split values that created the initial partition as the iteration space, creating a first next partition and a second next partition. In various implementations, the SLIP controller may use the tracker SLIP heuristic to create a split in the initial partition that is still being executed. The SLIP controller may do so by using the split value that created the initial partition and that is closest to an unexecuted iteration of the initial partition and the current iteration as the iteration space, creating a first next partition and a second next partition. The heterogeneous computing device that was still executing the initial partition may be assigned the first next partition for execution and the heterogeneous computing device that completed its initial partition may be assigned the second next partition for execution.

When multiple heterogeneous processing devices are available, the SLIP controller may select the heterogeneous processing device most likely to efficiently execute a next partition in creating the next partition and/or for executing the next partition. The SLIP heuristics of partitioning existing portions are not limited to partitioning initial partitions. Next partitions can also be partitioned when a heterogeneous processing device becomes available.

FIG. 1 illustrates a system including a computing device 10 in communication with a remote computing device suitable for use with the various embodiments. The computing device 10 may include a system-on-chip (SoC) 12 with a processor 14, a memory 16, a communication interface 18, and a storage memory interface 20. The computing device may further include a communication component 22 such as a wired or wireless modem, a storage memory 24, an antenna 26 for establishing a wireless communication link. The processor 14 may include any of a variety of processing devices, for example a number of processor cores.

The term "system-on-chip" (SoC) is used herein to refer to a set of interconnected electronic circuits typically, but not exclusively, including a processing device, a memory, and a communication interface. A processing device may include a variety of different types of processors 14 and processor cores, such as a general purpose processor, a central processing unit (CPU), a digital signal processor (DSP), a graphics processing unit (GPU), an accelerated processing unit (APU), an auxiliary processor, a single-core processor, and a multi-core processor. A processing device may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

An SoC 12 may include one or more processors 14. The computing device 10 may include more than one SoC 12, thereby increasing the number of processors 14 and processor cores. The computing device 10 may also include processors 14 that are not associated with an SoC 12. Individual processors 14 may be multi-core processors as described below with reference to FIG. 2. The processors 14 may each be configured for specific purposes that may be the same as or different from other processors 14 of the computing device 10. One or more of the processors 14 and processor cores of the same or different configurations may be grouped together. A group of processors 14 or processor cores may be referred to as a multi-processor cluster.

The memory 16 of the SoC 12 may be a volatile or non-volatile memory configured for storing data and processor-executable code for access by the processor 14. The computing device 10 and/or SoC 12 may include one or more memories 16 configured for various purposes. One or more memories 16 may include volatile memories such as random access memory (RAM) or main memory, or cache memory. These memories 16 may be configured to temporarily hold a limited amount of data received from a data sensor or subsystem, data and/or processor-executable code instructions that are requested from non-volatile memory, loaded to the memories 16 from non-volatile memory in anticipation of future access based on a variety of factors, and/or intermediary processing data and/or processor-executable code instructions produced by the processor 14 and temporarily stored for future quick access without being stored in non-volatile memory.

The memory 16 may be configured to store data and processor-executable code, at least temporarily, that is loaded to the memory 16 from another memory device, such as another memory 16 or storage memory 24, for access by one or more of the processors 14. The data or processor-executable code loaded to the memory 16 may be loaded in response to execution of a function by the processor 14. Loading the data or processor-executable code to the memory 16 in response to execution of a function may result from a memory access request to the memory 16 that is unsuccessful, or a miss, because the requested data or processor-executable code is not located in the memory 16. In response to a miss, a memory access request to another memory 16 or storage memory 24 may be made to load the requested data or processor-executable code from the other memory 16 or storage memory 24 to the memory device 16. Loading the data or processor-executable code to the memory 16 in response to execution of a function may result from a memory access request to another memory 16 or storage memory 24, and the data or processor-executable code may be loaded to the memory 16 for later access.

The storage memory interface 20 and the storage memory 24 may work in unison to allow the computing device 10 to store data and processor-executable code on a non-volatile storage medium. The storage memory 24 may be configured much like an embodiment of the memory 16 in which the storage memory 24 may store the data or processor-executable code for access by one or more of the processors 14. The storage memory 24, being non-volatile, may retain the information after the power of the computing device 10 has been shut off. When the power is turned back on and the computing device 10 reboots, the information stored on the storage memory 24 may be available to the computing device 10. The storage memory interface 20 may control access to the storage memory 24 and allow the processor 14 to read data from and write data to the storage memory 24.

Some or all of the components of the computing device 10 may be differently arranged and/or combined while still serving the necessary functions. Moreover, the computing device 10 may not be limited to one of each of the components, and multiple instances of each component may be included in various configurations of the computing device 10.

Figure 2:
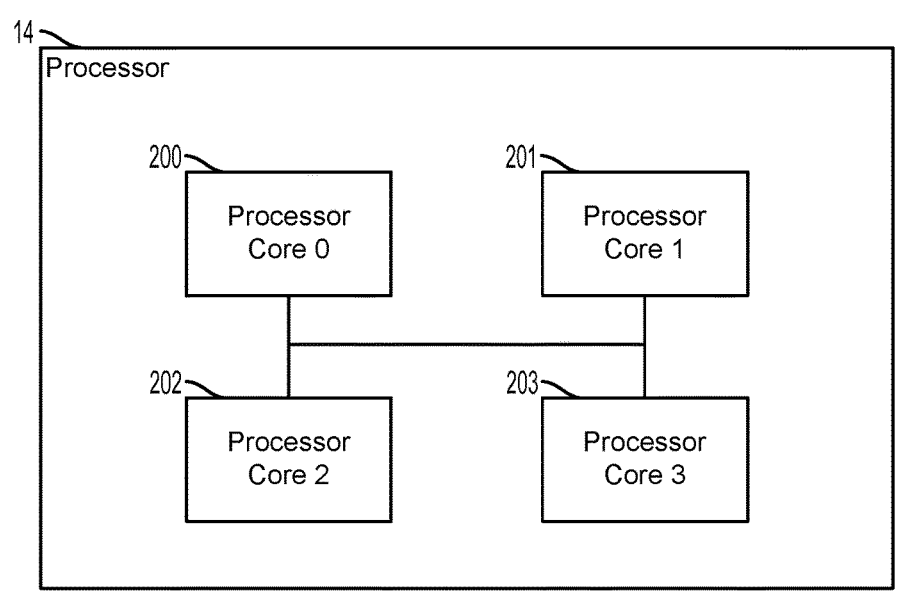
FIG. 2 is a component block diagram illustrating an example multi-core processor suitable for implementing an embodiment.

FIG. 2 illustrates a multi-core processor 14 suitable for implementing an embodiment. The multi-core processor 14 may have a plurality of homogeneous or heterogeneous processor cores 200, 201, 202, 203. The processor cores 200, 201, 202, 203 may be homogeneous in that, the processor cores 200, 201, 202, 203 of a single processor 14 may be configured for the same purpose and have the same or similar performance characteristics. For example, the processor 14 may be a general purpose processor, and the processor cores 200, 201, 202, 203 may be homogeneous general purpose processor cores. Alternatively, the processor 14 may be a graphics processing unit or a digital signal processor, and the processor cores 200, 201, 202, 203 may be homogeneous graphics processor cores or digital signal processor cores, respectively. For ease of reference, the terms "processor" and "processor core" may be used interchangeably herein.

The processor cores 200, 201, 202, 203 may be heterogeneous in that, the processor cores 200, 201, 202, 203 of a single processor 14 may be configured for different purposes and/or have different performance characteristics. The heterogeneity of such heterogeneous processor cores may include different instruction set architecture, pipelines, operating frequencies, etc. An example of such heterogeneous processor cores may include what are known as "big-.LITTLE" architectures in which slower, low-power processor cores may be coupled with more powerful and power-hungry processor cores. In similar embodiments, the SoC 12 may include a number of homogeneous or heterogeneous processors 14.

In the example illustrated in FIG. 2, the multi-core processor 14 includes four processor cores 200, 201, 202, 203 (i.e., processor core 0, processor core 1, processor core 2, and processor core 3). For ease of explanation, the examples herein may refer to the four processor cores 200, 201, 202, 203 illustrated in FIG. 2. However, the four processor cores 200, 201, 202, 203 illustrated in FIG. 2 and described herein are merely provided as an example and in no way are meant to limit the various embodiments to a four-core processor system. The computing device 10, the SoC 12, or the multi-core processor 14 may individually or in combination include fewer or more than the four processor cores 200, 201, 202, 203 illustrated and described herein.

FIGS. 3A-3D illustrate example embodiments of a SLIP system 300a-300d. In various embodiments, a SLIP system 300a-300d may include a central SLIP controller 304a, distributed SLIP controllers 304b, 304c, 304d, or a combination of central and distributed SLIP controller 304a, 304b, 304c, 304d. In various embodiments, any of the central and distributed SLIP controller 304a, 304b, 304c, 304d, may be included as an integrated hardware component of an SoC (e.g., SoC 12 of FIG. 1) or a processing device (e.g., processor 14 of FIGS. 1 and 2), a standalone hardware component of a computing device (e.g., computing device 10 of FIG. 1), or a program component (e.g., software or firmware) that may be executed by a processing device.

The example SLIP systems 300a, 300b, 300c, 300d, illustrated in FIGS. 3A-3D may include heterogeneous processing devices 302a, 302b, 302c, which may include any of the general or specialized processing devices described herein (e.g., processor 14 of FIGS. 1 and 2), and at least one of the heterogeneous processing devices 302a, 302b, 302c, may be configured differently from the other heterogeneous processing devices 302a, 302b, 302c. For example, the heterogeneous processing device 302a may be a CPU, while the other heterogeneous processing devices 302b, 302c, may be an accelerator such as a GPU, a DPS, and/or an APU. Another example may include heterogeneous processing devices 302a, 302b, 302c, of the same type, such as multiple CPUs, with various configurations, including different instruction set architecture, pipelines, operating frequencies, etc.

Figure 3A:
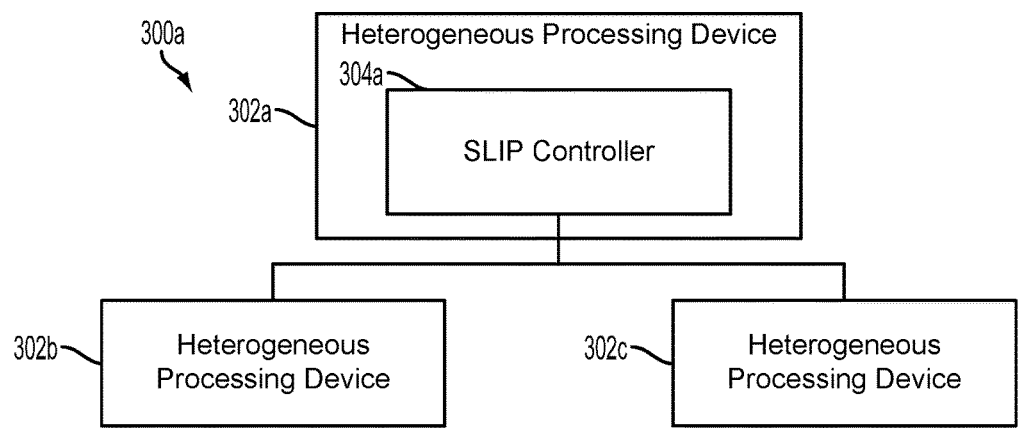
FIGS. 3A-3D are component block diagrams illustrating four examples of a speculative loop iteration partitioning system according to various embodiments.
Figure 3B:
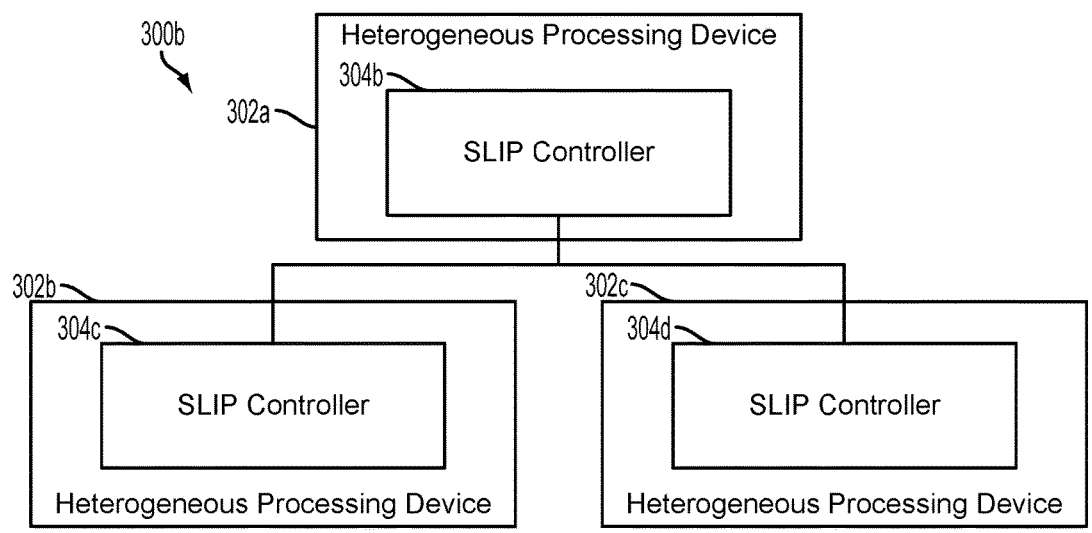
Figure 3C:
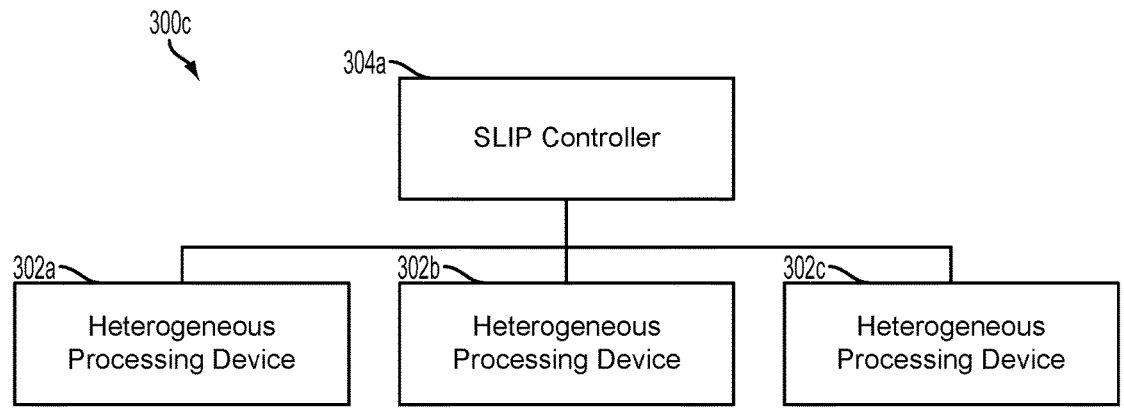

In various embodiments, such as the examples illustrated in FIGS. 3A and 3C, a centralized SLIP controller 304a may be communicatively connected to the multiple heterogeneous processing devices 302a, 302b, 302c. The centralized SLIP controller 304a may be configured to partition iteration spaces for repetitive processes assigned for execution by any of the heterogeneous processing devices 302a, 302b, 302c, and assign the partitions for execution by various of the heterogeneous processing devices 302a, 302b, 302c. The centralized SLIP controller 304a may be configured to partition the partitions it created, and assign these next partitions for execution by various of the heterogeneous processing devices 302a, 302b, 302c. In various embodiments, the centralized SLIP controller 304a may be configured to track the completed iterations or current iteration executed by the heterogeneous processing devices 302a, 302b, 302c. Tracking of the completed iterations or current iteration may include retrieving or receiving the iteration information from the heterogeneous processing devices 302a, 302b, 302c on a periodic and/or event basis. In various embodiments, the periodic basis for retrieving or receiving the iteration information from the heterogeneous processing devices 302a, 302b, 302c, may be based on an elapsed time period and/or a number of elapsed cycles of a heterogeneous processing device 302a, 302b, 302c, and/or the centralized SLIP controller 304a. In various embodiments, the event basis for retrieving or receiving the iteration information from the heterogeneous processing devices 302a, 302b, 302c, may be based on completion of a number of iterations, completion of a partition of the iteration space, and/or a request for work from a heterogeneous processing device 302a, 302b, 302c.

The example SLIP system 300a illustrated in FIG. 3A may include the centralized SLIP controller 304a as an incorporated hardware component of one of multiple heterogeneous processing devices 302a, 302b, 302c, heterogeneous processing device 302a in this example. The example SLIP system 300c illustrated in FIG. 3C may include the centralized SLIP controller 304a as incorporated hardware component of an SoC or standalone hardware component of a computing device.

Figure 3D:
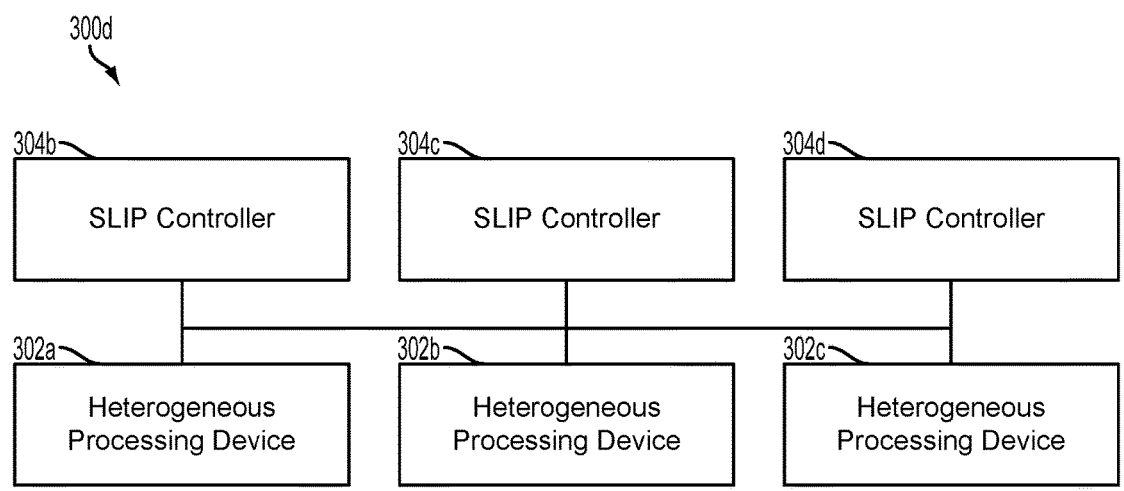

In various embodiments, such as the example illustrated in FIGS. 3B and 3D, distributed SLIP controllers 304b, 304c, 304d, may be communicatively connected to another of the distributed SLIP controllers 304b, 304c, 304d. In various embodiments, a distributed SLIP controller 304b, 304c, 304d, may be communicative connected to a centralized SLIP controller 304a. The distributed SLIP controllers 304b, 304c, 304d, may also be communicatively connected to an associated heterogeneous processing device 302a, 302b, 302c. The distributed SLIP controllers 304b, 304c, 304d, may be configured to partition iteration spaces for repetitive processes assigned for execution by their associated heterogeneous processing device 302a, 302b, 302c, and assign the partitions for execution by various of the heterogeneous processing devices 302a, 302b, 302c, via their associated distributed SLIP controllers 304b, 304c, 304d. The distributed SLIP controllers 304b, 304c, 304d, may be configured to partition the partitions it created, and assign these next partitions for execution by various of the heterogeneous processing devices 302a, 302b, 302c, via their associated distributed SLIP controllers 304b, 304c, 304d. In various embodiments the distributed SLIP controllers 304b, 304c, 304d, may be configured to track the completed iterations or current iteration executed by the heterogeneous processing devices 302a, 302b, 302c. Tracking of the completed iterations or current iteration may include retrieving or receiving the iteration information from the associated heterogeneous processing device 302a, 302b, 302c, and/or from other distributed SLIP controllers 304b, 304c, 304d, tracking the completed iterations or current iteration of its associated heterogeneous processing device 302a, 302b, 302c. Tracking of the completed iterations or current iteration may occur on a periodic and/or event basis. In various embodiments, the periodic basis for retrieving or receiving the iteration information from the heterogeneous processing devices 302a, 302b, 302c, may be based on an elapsed time period and/or a number of elapsed cycles of a heterogeneous processing device 302a, 302b, 302c, and/or the associated distributed SLIP controller 304b, 304c, 304d. In various embodiments, the event basis for retrieving or receiving the iteration information from the heterogeneous processing devices 302a, 302b, 302c, may be based on completion of a number of iterations, completion of a partition of the iteration space, and/or a request for work from an associated heterogeneous processing device 302a, 302b, 302c and/or another distributed SLIP controller 304b, 304c, 304d.

The example SLIP system 300b illustrated in FIG. 3B may include the distributed SLIP controllers 304b, 304c, 304d, as incorporated hardware components of multiple heterogeneous processing devices 302a, 302b, 302c. The example SLIP system 300d illustrated in FIG. 3D may include the distributed SLIP controllers 304b, 304c, 304d, as incorporated hardware components of at least one SoC or standalone hardware components of a computing device. In these examples, the distributed SLIP controller 304b may be associated with the heterogeneous processing devices 302a, the distributed SLIP controller 304c may be associated with the heterogeneous processing devices 302b, and the distributed SLIP controller 304d may be associated with the heterogeneous processing devices 302c.

In various embodiments the SLIP controllers 304a, 304b, 304c, 304d, may be configured to determine a SLIP heuristic to use to partition the iteration space and to further partition the partitions of the iteration space based on available SLIP information and/or a prioritization of the SLIP heuristics. The available SLIP information may include: a number of iterations of an iteration space and/or a partition; a number of available heterogeneous processing devices 302a, 302b, 302c; processing capabilities of the heterogeneous processing devices 302a, 302b, 302c (e.g., processing frequency); recorded performance of prior executions of partitions for a repetitive process by the heterogeneous processing devices 302a, 302b, 302c; prior partitions used for the repetitive process and/or assignment of those partitions to the heterogeneous processing devices 302a, 302b, 302c; and/or a number of completed and/or a current iteration of partitions executed by the heterogeneous processing devices 302a, 302b, 302c. In various embodiments, the available SLIP information may be compiled from offline executions of a repetitive run during testing and/or development and pre-programmed for use by the SLIP controllers 304a, 304b, 304c, 304d, and/or complied during previous and current runtime executions of a repetitive process. In various embodiments, the available SLIP information may be expressed and/or stored in absolute and/or relative terms between the heterogeneous processing devices 302a, 302b, 302c. For example, SLIP information may be expressed and/or stored as individual values of the SLIP information gathered for the individual heterogeneous processing devices 302a, 302b, 302c, and/or as ratios of the SLIP information gathered for combinations of the heterogeneous processing devices 302a, 302b, 302c. The prioritization of the SLIP heuristics may be based on a likelihood to further approach or achieve an ideal split of the iterations for the partitions. The SLIP heuristics may each use particular SLIP information. A higher priority SLIP heuristic may be used instead of a lower priority SLIP heuristic when the particular SLIP information for the higher priority SLIP heuristic is available. A lower priority SLIP heuristic may be used instead of a higher priority SLIP heuristic when the particular SLIP information for the higher priority SLIP heuristic is unavailable.

A uniform SLIP heuristic may be assigned a first (or lowest) priority among the SLIP heuristics. The uniform SLIP heuristic may use the number of iterations of the iteration space and the number of available heterogeneous processing devices 302a, 302b, 302c. The uniform SLIP heuristic may divide the iteration space into equal partitions among the available heterogeneous processing devices 302a, 302b, 302c.

A prediction SLIP heuristic may be assigned a second (or higher than uniform SLIP heuristic but lower than historical SLIP heuristic) priority among the SLIP heuristics. The prediction SLIP heuristic may use the processing capabilities of the available heterogeneous processing devices 302a, 302b, 302c. The prediction SLIP heuristic may divide the iteration space into proportionately sized partitions based on the comparative processing capabilities of the available heterogeneous processing devices 302a, 302b, 302c. For example, the relative processing capabilities of the available heterogeneous processing devices 302a, 302b, 302c may be expressed as a ratio of the processing capabilities of the available heterogeneous processing devices 302a, 302b, 302c. To proportionately size partitions, the number of iterations for each of the partitions may correspond to the ratio. In other words, a ratio of the number of iterations per partition versus the number of the iteration space may be similar to the ratio of the comparative processing capabilities of the available heterogeneous processing devices 302a, 302b, 302c.

A historical SLIP heuristic may be assigned a third (or higher than historical SLIP heuristic but lower than tracker SLIP heuristic) priority among the SLIP heuristics. The historical SLIP heuristic may use recorded performance of prior executions of partitions of an iteration space for a repetitive process and/or prior partitions used for the same repetitive process. In various embodiments, the prior partitions used for the same repetitive process may include partitions that are deemed to have achieved a threshold level of performance for a specific set of factors matching a current set of factors. The factors may include the repetitive process, the number of iterations to be executed, and the available heterogeneous processing devices 302a, 302b, 302c. In various embodiments, the historical SLIP heuristic may divide the iteration space into proportionately sized partitions based on the recorded performance of prior executions of partitions. For example, in prior executions of partitions for the repetitive process, it may have been recorded that a first heterogeneous processing device performed better than a second heterogeneous processing device by completing execution of a number of iterations faster than the second heterogeneous processing device. In a later execution of the repetitive process, the historical SLIP heuristic may have divided the iteration space based on the relative speed of the first heterogeneous processing device to the second heterogeneous processing device, assigning the first heterogeneous processing device a proportionately larger partition than the second heterogeneous processing device. In various embodiments, the historical SLIP heuristic may divide the iteration space into partitions equal in size to prior partitions used for the execution of the repetitive process.

A tracker SLIP heuristic may be assigned a fourth (or highest) priority among the SLIP heuristics. The tracker SLIP heuristic may use the number of completed iterations and/or the current iteration of a partition being executed, and any of the SLIP information used to implement the other SLIP heuristics. The tracker SLIP heuristic may include a modification to any of the historical SLIP heuristic, the prediction SLIP heuristic, and the uniform SLIP heuristic. Which of the historical SLIP heuristic, the prediction SLIP heuristic, and the uniform SLIP heuristic may be used to implement the tracker SLIP heuristic may be based on the same criteria for selecting between the historical SLIP heuristic, the prediction SLIP heuristic, and the uniform SLIP heuristic, including available SLIP information and priority. The tracker SLIP heuristic may modify the uniform SLIP heuristic by using the current iteration to determine the number of iterations of a partition that may be partitioned. The tracker SLIP heuristic may use the current iteration and a boundary iteration of the partition (including an unexecuted first iteration, an unexecuted last iteration, or an unexecuted iteration closest to a split value) or the split value to determine the remaining iterations between the current iteration and the boundary iteration. The tracker SLIP heuristic may evenly partition the remaining iterations based on the number of available heterogeneous processing devices 302a, 302b, 302c. Similarly, the tracker SLIP heuristic may modify the prediction SLIP heuristic and the historical SLIP heuristic by using the remaining iterations as the iterations space for partitioning using the prediction SLIP heuristic and the historical SLIP heuristic.

The SLIP heuristics may be implemented to determine a split value between iteration at which to partition the iteration space, which may include other partitions. Any of the historical SLIP heuristic, the prediction SLIP heuristic, and the uniform SLIP heuristic may be used to create initial partitions of the iterations space for a repetitive process. Any of the tracker SLIP heuristic, the historical SLIP heuristic, the prediction SLIP heuristic, and the uniform SLIP heuristic may be used to create next partitions of the initial partitions and/or of other next partitions.

The number and combinations of SLIP controllers and processing devices are not limited to the examples illustrated in FIGS. 3A-3D. Any number and combination of SLIP controllers and processing devices may be used to configure a SLIP system, including any combination of centralized and/or distributed SLIP controllers. Such combinations may also include combinations of SLIP controllers as integrated hardware components, standalone hardware components, and/or program components.

Figure 4:
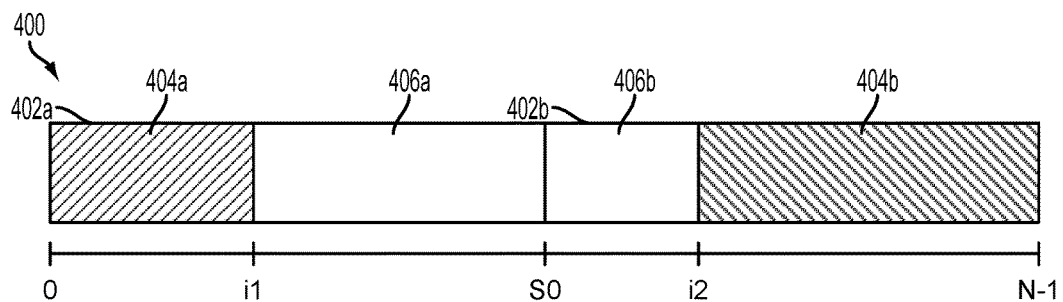
FIG. 4 is a block diagram illustrating an example of speculative loop iteration partitioning according to an embodiment.

FIG. 4 illustrates an example of implementing SLIP for initial partitions according to an embodiment. An iteration space 400 may represent a number N of iterations, ranging from iteration 0 (a first iteration) to iteration N-1 (an Nth iteration), for a repetitive process assigned for execution by a first heterogeneous processing device. A SLIP controller, communicatively connected to the first heterogeneous processing device, may identify the repetitive process, select an initial split value S0 between iterations at which to partition the iteration space 400 into initial partitions 402a, 402b. As discussed herein, the initial split value may be selected using any of the historical SLIP heuristic, the prediction SLIP heuristic, and the uniform SLIP heuristic. Which of the SLIP heuristics may be implemented to create the initial partitions 402a, 402b, may be preprogrammed and/or based on the available SLIP information and/or priority of the SLIP heuristics. The split value S0 may be equidistant from iteration 0 and iteration N-1, or may be closer to one of iteration 0 and iteration N-1. In the various embodiments described herein, the initial partitions 402a, 402b, are merely used as convenient examples for explanation. It is understood that similar descriptions are also applicable to next or remaining partitions as described further herein.

The initial partitions 402a, 402b, may be assigned to individual heterogeneous processing devices. Each of the heterogeneous processing devices may execute the iterations of the initial partitions 402a, 402b, which are assigned to the heterogeneous processing devices. Completed iterations 404a, 404b, of the initial partitions 402a, 402b, are illustrated as shaded portions of the iteration space 400. Pending iterations 406a, 406b, of the initial partitions 402a, 402b, are illustrated as unshaded portions of the iteration space 400. The boundaries between the completed iterations 404a, 404b, and the pending iterations 406a, 406b, may be the current iterations i1 of the initial partition 402a, and current iteration i2 of the initial partition 402b. The direction of execution of the iterations of the initial partitions 402a, 402b, may be arbitrary. In other words, while the example illustrated in FIG. 4 shows execution of the iterations of initial partition 402a progressing from iteration 0 toward S0, and execution of the iterations of initial partition 402b progressing from iteration N-1 toward S0, the iterations may be executed in any direction.

The rate of progression for executing the iterations of the initial partitions 402a, 402b, the number of completed iterations 404a, 404b, the number of pending iterations 406a, 406b, and the current iterations i1, i2, may depend on the number of iterations of the initial partitions 402a, 402b, the type of work executed for the repetitive process, and the processing characteristics of the heterogeneous processing devices.

In the various embodiments described herein relating to further partitioning of partitions, the initial partitions 402a, 402b, are merely used as convenient examples for explanation. It is understood that similar descriptions of partitioning partitions are also applicable to next or remaining partitions as described further herein.

Figure 5:
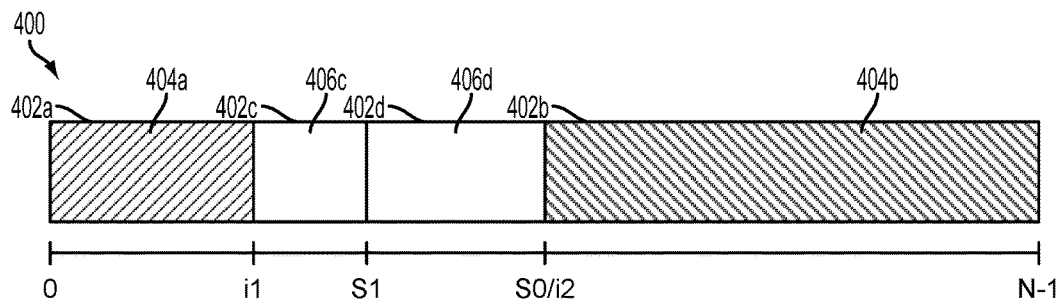
FIG. 5 is a block diagram illustrating an example of speculative loop iteration partitioning according to an embodiment.

FIG. 5 illustrates an example of implementing SLIP for creating next partitions according to an embodiment. After an elapsed time, the iterations of one of the initial partitions 402a, 402b, may be fully executed before the iterations of the other of the initial partitions 402a, 402b. In the example illustrated in FIG. 5, the iterations of the initial partition 402b are fully executed. The completed iterations 404b are greater than or equal to the iterations of the initial partition 402b, and there are no pending iterations 406b. The iterations of the initial partition 402a are not yet fully executed. The completed iterations 404a are less than the iterations of the initial partition 402a.

The remaining iterations of the initial partition 402a may be further partitioned by the SLIP controller into next partitions 402c, 402d. The SLIP controller may use the available SLIP information to select from the tracker SLIP heuristic, the historical SLIP heuristic, the prediction SLIP heuristic, and the uniform SLIP heuristic, to create the next partitions 402c, 402d. The SLIP controller may select a next split value somewhere in the range of iterations of the incomplete initial partition 402a or the remaining iterations of the incomplete initial partition 402a (e.g., pending iterations 406a in FIG. 4). In other words, the SLIP controller may select a next split value somewhere between the first iteration and the last iteration of the initial partition, or between the current iteration and the furthest unexecuted iteration from the current iteration of the initial partition 402a. In the example illustrated in FIG. 5, the SLIP controller may select a next split value S1 somewhere between iteration 0 and an iteration immediately before the split value S0, or between the current iteration i1 and the iteration immediately before split value S0. Using the next split value S1, the SLIP controller may partition initial partition 402a into next partitions 402c, 402d, around the next split value S1.

In various embodiments, information relating to the current iteration i1 may not be available. Without using any iteration or SLIP information relating to the current iteration, processing characteristics of the heterogeneous processing devices, or any prior executions of the repetitive process, the SLIP controller may use the uniform SLIP heuristic to select a next split value S1 evenly between the first iteration and the last iteration of the incomplete initial partition 402a. In this example, the next split value S1 may be evenly between iteration 0 and an iteration immediately before the split value S0. Without using the iteration information of the current iteration i1, but using SLIP information relating to processing characteristics, historical performance, and/or prior splits for the heterogeneous processing device, the SLIP controller may use the historical SLIP heuristic or the prediction SLIP heuristic to select the next split value S1 proportionately between the first iteration and the last iteration of the incomplete initial partition 402a. In this example, the next split value S1 may be proportionately between iteration 0 and an iteration immediately before the split value S0. In various embodiments, the next partition 402c may include iterations ranging from iteration 0 to an iteration immediately before next split value S1, and next partition 402d may include iterations ranging from an iteration immediately after next split value S1 to an iteration immediately before split value S0.

Without using the iteration information of the current iteration i1, but using SLIP information relating to processing characteristics, historical performance, and/or prior splits for the heterogeneous processing device, the SLIP controller may select split value S1 based on calculations of what the current iteration of the incomplete initial partition may be. The SLIP controller may use the tracker SLIP heuristic with the calculated current iteration to select a next split value S1 evenly or proportionately between the calculated current iteration and a furthest unexecuted iteration from the calculated current iteration of the incomplete initial partition 402a. In this example, the next split value S1 may be evenly or proportionately between the calculated current iteration i1 and an iteration immediately before the split value S0. In various embodiments, next partition 402c may include iterations ranging from iteration 0 to an iteration immediately before next split value S1, and next partition 402d may include iterations ranging from an iteration immediately after next split value S1 to an iteration immediately before split value S0. Calculated current iteration i1 may be substituted for iteration 0, however calculated current iteration i1 may not match current iteration i1 and the next partition 402c may start after current iteration i1.

Using iteration information of the current iteration i1, but without using SLIP information relating to processing characteristics, historical performance, and/or prior splits for the heterogeneous processing device, the SLIP controller may use the tracker SLIP heuristic with the modified uniform SLIP heuristic to select the next split value S1 evenly between the current iteration i1 and a furthest unexecuted iteration from the current iteration i1 of the incomplete initial partition 402a. In this example, the next split value S1 may be evenly between current iteration i1 and an iteration immediately before the split value S0. Using iteration information of the current iteration i1, and SLIP information relating to processing characteristics, historical performance, and/or prior splits for the heterogeneous processing device the SLIP controller may use the tracker SLIP heuristic and the modified historical SLIP heuristic or the modified prediction SLIP heuristic to select the next split value S1 proportionately between the current iteration i1 and a furthest unexecuted iteration from the current iteration i1 of the incomplete initial partition 402a. In this example, the next split value S1 may be proportionately between current iteration i1 and an iteration immediately before the split value S0. In various embodiments, next partition 402c may include iterations ranging from current iteration i1 to an iteration immediately before next split value S1, and next partition 402d may include iterations ranging from an iteration immediately after next split value S1 to an iteration immediately before split value S0.

The SLIP controller may assign the next partitions 402c, 402d, to the heterogeneous processing device that was processing the incomplete initial partition 402a and the heterogeneous processing device that completed the initial partition 402b. After the assignment of the next partitions 402c, 402d, the pending iterations 406c, 406d, may be executed by a respective heterogeneous processing device assigned an associated next partition 402c, 402d.

In various embodiments, the example illustrated in FIG. 5 may be implemented in a similar manner for next partitions instead of initiation partitions.

Figure 6:
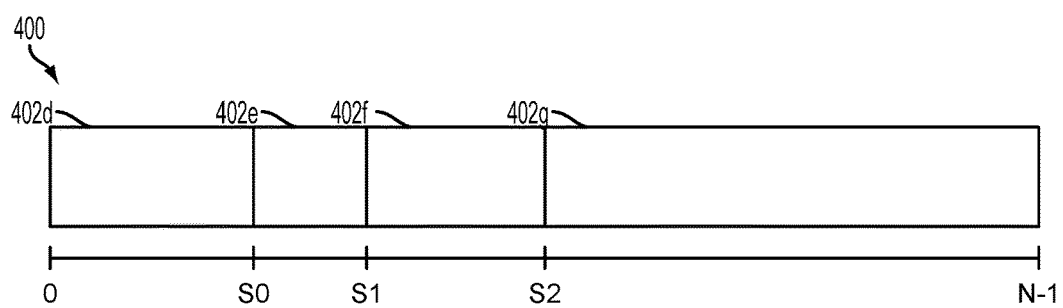
FIG. 6 is a block diagram illustrating an example of speculative loop iteration partitioning according to an embodiment.

FIG. 6 illustrates an example of implementing SLIP for more than two available heterogeneous processing devices according to an embodiment. In various embodiments, initial partitions and next partitions may be created based on the availability of more than two heterogeneous processing devices. In the example illustrated in FIG. 6, two or more (initial and/or next) partitions 402d, 402e, 402f, 402g, may be created using any or a combination of SLIP heuristics.

In a first example, partitions 402d, 402e, 402f, 402g, may be initial partitions created using any or a combination of SLIP heuristics based on the availability of four heterogeneous processing devices. In a second example, partition 402g may be an initial partition created along with another initial partition (not shown) based on the availability of two heterogeneous processing devices. Upon availability of two more heterogeneous processing devices, the partitions 402d, 402e, 402f, may be created as next partitions by partitioning the other initial partition.

Figure 7A:
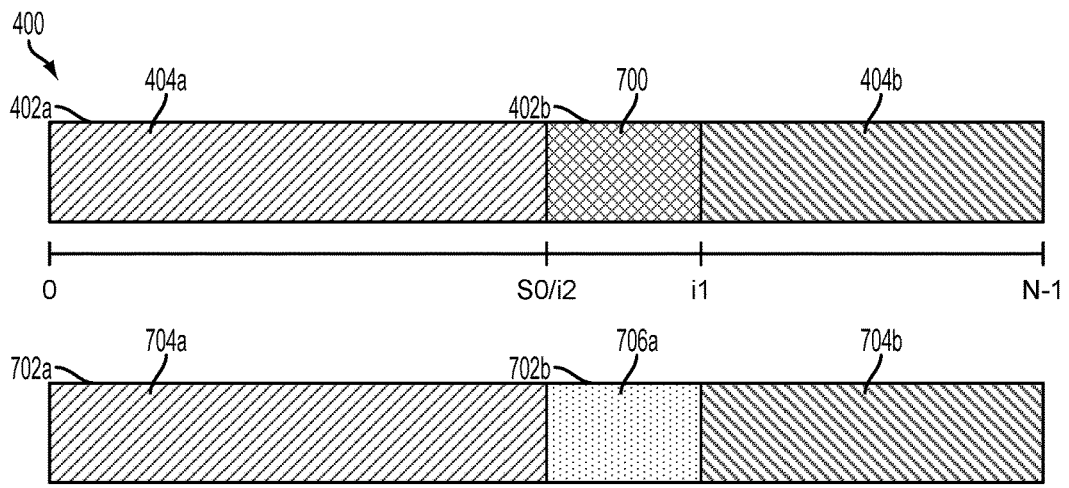
FIGS. 7A-7C are block diagrams illustrating three examples of outputs of results of executed repetitive process iterations using speculative loop iteration partitioning according to various embodiments.
Figure 7B:
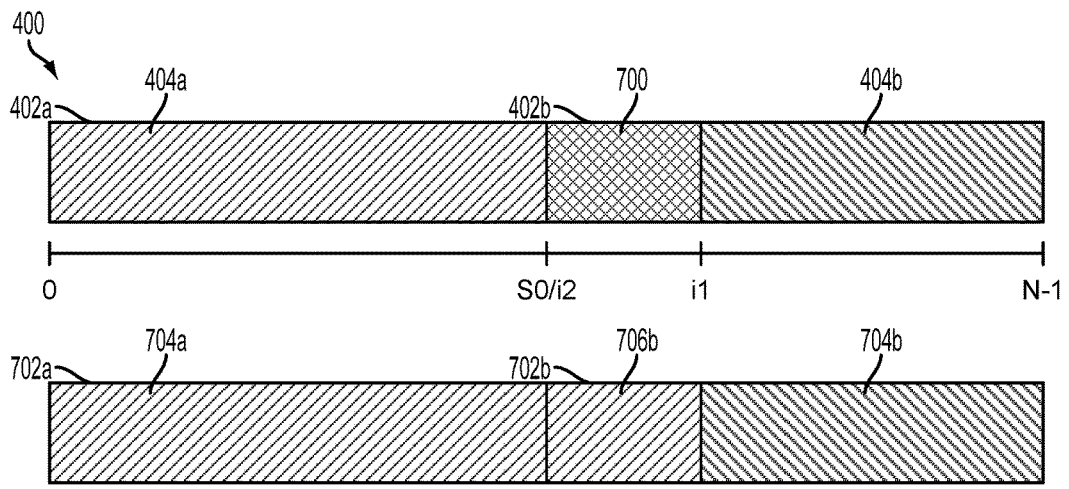
Figure 7C:
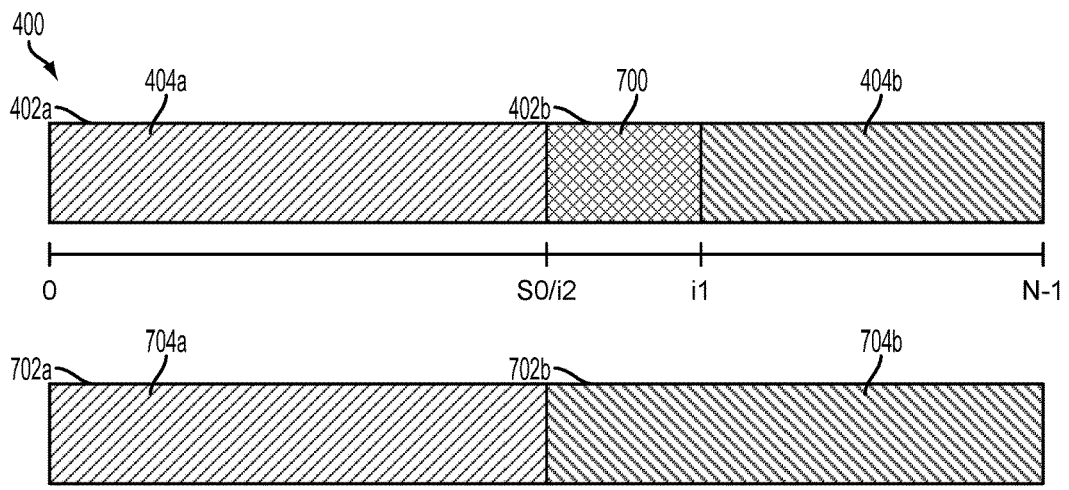

FIGS. 7A-7C illustrate examples of outputs of results of executed repetitive process iterations using speculative loop iteration partitioning according to various embodiments. During execution of the iterations assigned to each of the heterogeneous processing devices, a heterogeneous processing device may continue to execute iterations beyond its assigned (initial and/or next) partition. Using the same iteration space 400 of the previous examples, initial partition 402a may be completed, and the completed iterations 404a may equal the iterations of the initial partition 402a. The initial partition 402b may still be being executed when initial partition 402a is completed. For example, the heterogeneous processing device executing initial partition 402b may have executed completed iterations 404b by the time initial partition 402a is completed. In various embodiments, the heterogeneous processing device executing the initial partition 402a may continue to execute iterations of the iterations space 400 after it has completed executing the initial partition 402a, executing iterations of the initial partition 402b. The heterogeneous processing device executing iterations outside of its assigned initial partition 402a into initial partition 402b and the heterogeneous processing device assigned to execute initial partition 402b may both complete executing iterations 700 of the initial partition 402b. In such instances, the current iteration i1 for the heterogeneous processor assigned to execute the initial partition 402a may be an iteration of the initial partition 402b. Such overlaps may occur when the SLIP controller is not informed about the completion of the initial partition 402a until after the heterogeneous processing device assigned initial partition 402a has executed iterations of the initial partition 402b. Overlaps may also occur if the SLIP controller is informed of the completion of the initial partition 402a in a timely manner, but determines that it cannot split the initial partition 402b.

The outputs of the executions of the iterations of the iteration space 400 may be copied to output buffers 702a, 702b. The outputs of each of the partitions may be output to a designated buffer. In the examples illustrated in FIGS. 7A-7C, the outputs of the initial partition 402a may be copied to the buffer 702a and the outputs of the initial partition 402b may be copied to the buffer 702b. The outputs of the initial partition 402b copied to the buffer 702b may include the results of the executions of the completed iterations 404b and the completed iterations 700. Because of the overlapping execution of the completed iterations 700, there may be duplicate outputs that may be copied to the buffer 702b. The SLIP controller may choose whether to copy the full outputs of each initial partition 402a, 402b, or whether to copy a combination of full and partial outputs of the iterations executed by the heterogeneous processing devices. Copying full outputs of both initial partitions 402a, 402b, may result in the later copied outputs overwriting the earlier copied outputs for the iterations 700 executed by multiple heterogeneous processing devices.

In the example illustrated in FIG. 7A, the outputs 704a of the completed iterations 404a may be copied to the buffer 702a, and the outputs 704b of the completed iterations 404b may be copied to the buffer 702b. In various embodiments, the outputs 706a corresponding to the execution of the completed iterations 700 first may be copied to the buffer 702b using the outputs of the completed iterations 700 executed by the heterogeneous processing device that executed the initial partition 402a and continued to execute the completed iterations 700. The outputs first copied may be overwritten by the outputs 706a of the completed iterations 700 executed by the heterogeneous processing device that executed the initial partition 402b. In various embodiments, rather than overwriting the outputs 706a corresponding to the execution of the completed iterations 700 by the heterogeneous processing device that executed the initial partition 402a, the outputs 706a corresponding to the execution of the completed iterations 700 first may be copied to the buffer 702b using the outputs of the completed iterations 700 executed by the heterogeneous processing device that executed the initial partition 402b. The outputs first copied may be overwritten by the outputs 706a of the completed iterations 700 executed by the heterogeneous processing device that executed the initial partition 402a and continued to execute the completed iterations 700.

In the example illustrated in FIG. 7B, the outputs 704a of the completed iterations 404a may be copied to the buffer 702a, and the outputs 704b of the completed iterations 404b may be copied to the buffer 702b. Further, the outputs 706b of the completed iterations 700, executed by the heterogeneous processing device that executed the initial partition 402a and continued to execute the completed iterations 700, may be copied to the buffer 702b.

In the example illustrated in FIG. 7C, the outputs 704a of the completed iterations 404a may be copied to the buffer 702a, and the outputs 704b of the completed iterations 404b may be copied to the buffer 702b. Further, the outputs the completed iterations 700, executed by the heterogeneous processing device that executed the initial partition 402b, may be included with the outputs 704b of the initial partition 402b that may be copied to the buffer 702b.

Figure 8:
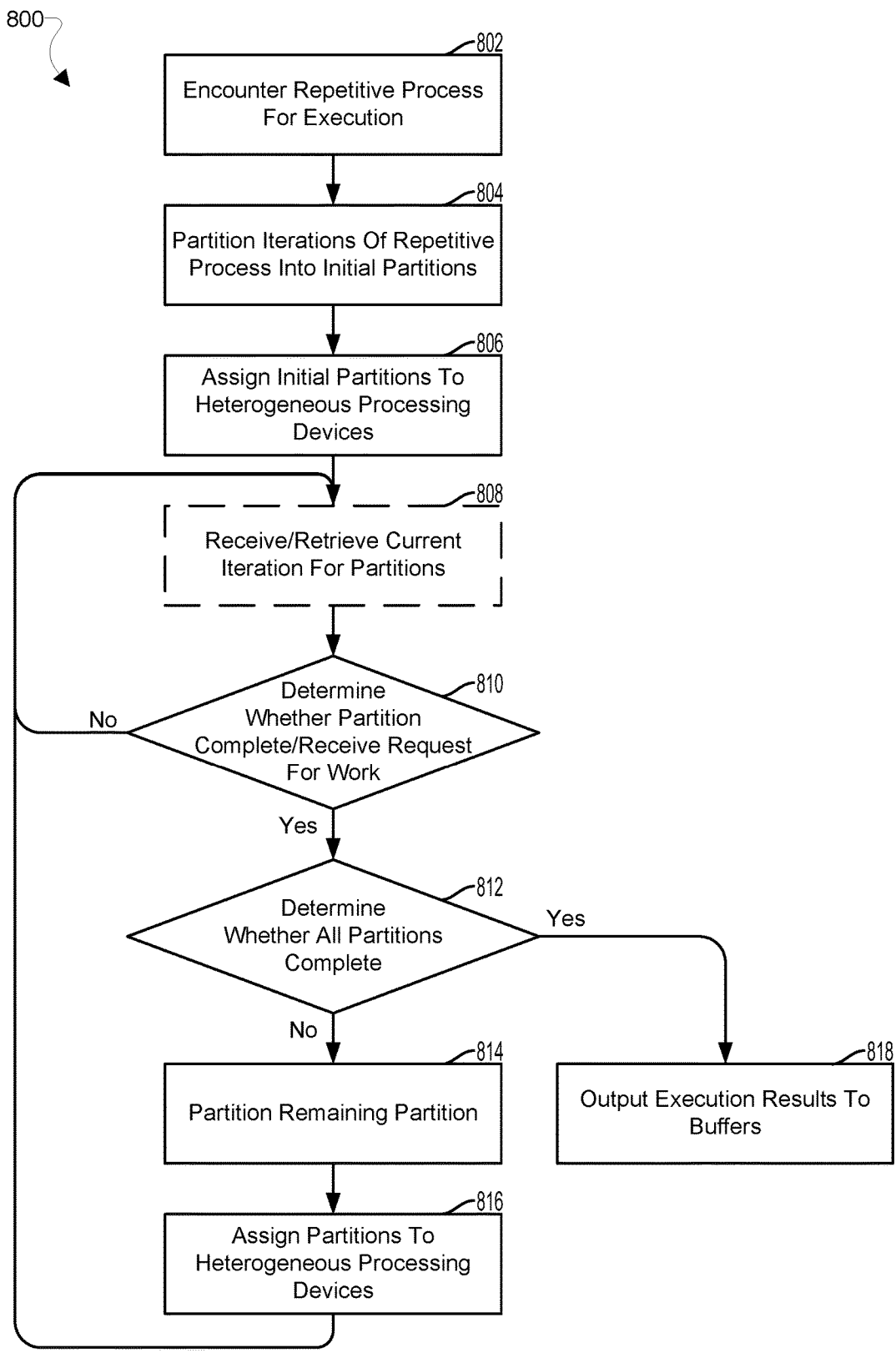
FIG. 8 is a process flow diagram illustrating a method for speculative loop iteration partitioning according to an embodiment.

FIG. 8 illustrates a method 800 for SLIP according to an embodiment. The method 800 may be implemented in a computing device in software executing in a processor (e.g., the processor 14 in FIGS. 1 and 2), in general purpose hardware, in dedicated hardware (e.g., the SLIP controller 304a, 304b, 304c, 304d, in FIGS. 3A-3D), or in a combination of a processor and dedicated hardware, such as a processor executing software within a SLIP system that includes other individual components. In order to encompass the alternative configurations enabled in the various embodiments, the hardware implementing the method 800 is referred to herein as a "processing device."

In block 802, the processing device may encounter a repetitive process for execution. In block 804, the processing device may partition iterations of the repetitive process into initial partitions. The processing device may be configured to use a specific one or select from the uniform SLIP heuristic, the historical SLIP heuristic, and the prediction SLIP heuristic. Whether the processing device may use and select a particular one of the uniform SLIP heuristic, the historical SLIP heuristic, and the prediction SLIP heuristic, may depend on the availability of SLIP information relating to processing characteristics, historical performance, and/or prior splits for available heterogeneous processing devices. The processing device may select between multiple SLIP heuristics, for which the SLIP information is available, using priorities of the SLIP heuristics by selecting the SLIP heuristic with the highest priority. Partitioning iterations of the repetitive processed is discussed in further detail herein with reference to the method 900 in FIG. 9.

In block 806, the processing device may assign partitions to the available heterogeneous processing devices. Which of the heterogeneous processing devices is assigned to which partition may be dependent on the SLIP heuristic used to partition the iterations. For example, assignment of the partitions to the heterogeneous processing devices may be arbitrary for evenly split partitions created using the uniform SLIP heuristic. In various examples, assignment of the partitions to the heterogeneous processing devices may depend on the SLIP information used to create the partitions, including processing characteristics of the heterogeneous processing devices, historical performance of the heterogeneous processing devices, and prior splits and assignments to the heterogeneous processing devices. The partitions created in correlation with SLIP information of a heterogeneous processing device may be assigned to the heterogeneous processing device. In various embodiments, the processing device may assign a partition to a heterogeneous processing device, and/or signal to another processing device associated with the heterogeneous processing device for the other processing device to assign the partition to the heterogeneous processing device.

In optional block 808, the processing device may receive and/or retrieve iteration information for the executing partitions, including a current iteration and/or a number of completed iterations. In various embodiments, the processing device may receive and/or retrieve the iteration information from a heterogeneous processing device executing a partition, and/or receive and/or retrieve the iteration information from another processing device associated with the heterogeneous processing device executing the partition. As discussed herein, receipt and/or retrieval of the iteration information may be periodic and/or event based. Periodic receipt and/or retrieval may be based on elapsed time and/or elapsed processing device cycles. Event based receipt and/or retrieval may be based on completion of a number of iteration, completion of a partition, and/or a request for work.

In determination block 810, the processing device may determine whether execution of a partition is complete and/or a request for work is received. In various embodiments, the request for work may be received from an available heterogeneous processing device and/or another processing device associated with the available heterogeneous processing device. The request for work may be in relation to the heterogeneous processing device becoming available because of completion of an assigned partition, completion of a task unrelated to the execution of the repetitive process, and/or becoming active from an inactive state. In various embodiments, determining whether execution of a partition is complete may be based on a comparison of the iterations of a partition and iteration information for the partition. For example, the iterations of the partition may be compared to a number of completed iterations or a current iteration to determine whether all of the iterations of the partition have been executed. In various embodiments, the processing device may make the determination of whether execution of a partition is complete and/or the processing device may receive an indication from another processing device, which has made the determination for an associated heterogeneous processing device, that the execution of the partition is complete.

In response to determining that execution of a partition is not complete and/or a request for work is not received (i.e., determination block 810="No"), the processing device may again determine whether execution of a partition is complete and/or a request for work is received in determination block 810. In response to determining that execution of a partition is complete and/or a request for work is received (i.e., determination block 810="Yes"), the processing device may determine whether all of the assigned partitions are complete in determination block 812. In various embodiments, the processing device may make the determination of whether all of the assigned partitions are complete by comparing the iteration information for the assigned partitions to the iterations of the partition, and/or by receiving an indication from another processing device, which has made the determination for a partition assigned an associated heterogeneous processing device, that the execution of the partition is complete.

In response to determining that all of the assigned partitions are complete (i.e., determination block 812="Yes"), the processing device may output the results of the execution of the iterations to output buffers in block 818. The processing device may select which outputs of overlapping executions of iterations to output to the buffers, and/or in which order. In response to determining that all of the assigned partitions are not complete (i.e., determination block 812="No"), the processing device may partition a remaining partition (either an initial or next partition that has not completed execution) into next partitions in block 814.

The processing device may partition the remaining partition in a similar manner to partitioning the iterations of the repetitive process described with reference to block 804. However, the processing device may additionally take into account iteration information for the remaining partition and use the tracker SLIP heuristic with the iteration information. Further, in various embodiments, the processing device may partition the remaining partition, a processing device associated with the heterogeneous processing device executing the remaining partition may partition the remaining partition, and/or a processing device associated with an available heterogeneous processing device may partition the remaining partition.

In block 816, the processing device may assign the next partitions to the heterogeneous processing device that was executing the remaining partition and an available heterogeneous processing device. Assignment of the next partition may be implemented in a similar manner to the assignment of the initial partitions discussed herein with reference to block 806.

Figure 9:
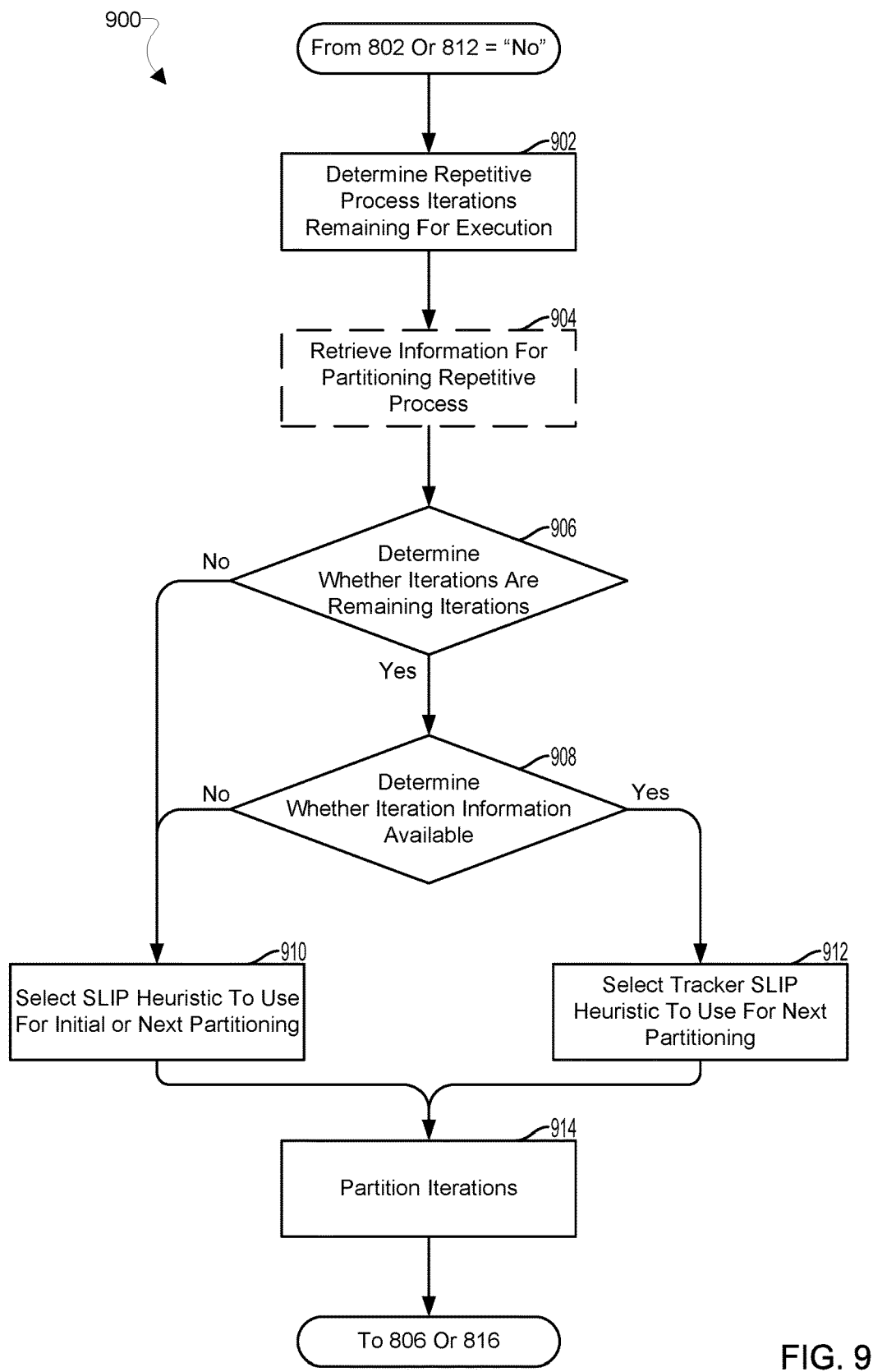
FIG. 9 is a process flow diagram illustrating a method for speculative loop iteration partitioning according to an embodiment.

FIG. 9 illustrates a method 900 for SLIP according to an embodiment. The method 900 may be implemented in a computing device in software executing in a processor (e.g., the processor 14 in FIGS. 1 and 2), in general purpose hardware, in dedicated hardware (e.g., the SLIP controller 304a, 304b, 304c, 304d, in FIGS. 3A-3D), or in a combination of a processor and dedicated hardware, such as a processor executing software within a SLIP system that includes other individual components. In order to encompass the alternative configurations enabled in the various embodiments, the hardware implementing the method 900 is referred to herein as a "processing device." The method 900 may further describe the partitioning of iterations of the repetitive process into initial partitions in block 804 and/or a remaining partition (either an initially or next partition that has not completed execution) into next partitions in block 814 of the method 800 described with reference to FIG. 8.

In block 902, the processing device may determine the repetitive process iterations remaining for execution. The determination may be of the total number of iterations for the repetitive process and/or for the iterations of a remaining partition. In various embodiments, the processing device may determine the iterations of a remaining partition using iteration information of the remaining partition, and/or the processing device may receive and/or retrieve information of the remaining partitions from another processing device associated with the heterogeneous processing device executing the remaining partition.

In optional block 904, the processing device may retrieve SLIP information for use in partitioning the iterations or the repetitive process and/or the iterations of the remaining partition.

In determination block 906, the processing device may determine whether the iterations are remaining iterations of a remaining partition. The processing device may check records of assignments of initial and/or next partitions to determine whether the iterations to be split are remaining iterations of a remaining partition.

In response to determining that the iterations are not remaining iterations of a remaining partition (i.e., determination block 906="No"), the processing device may select a SLIP heuristic for use for initial partitioning of the iterations in block 910. Initial partitioning may result in the creation of initial partitions. As such, there may not be any iteration information available. The processing device may select a SLIP heuristic from the uniform SLIP heuristic, the historical SLIP heuristic, and the prediction SLIP heuristic, depending on the available SLIP information and priorities of the SLIP heuristics as described herein.

In block 914, the processing device may partition the iterations of the repetitive process into initial partitions using the selected SLIP heuristic. Partitioning the iterations may include selecting a split value between two iterations and partitioning the iterations using the split value.

In response to determining that the iterations are remaining iterations of a remaining partition (i.e., determination block 906="Yes"), the processing device may determine whether iteration information is available for the remaining partition in determination block 908. In various embodiments, the iteration information for the remaining partition may already be retrieved and/or received, as described herein with reference to the optional block 808 of the method 800 in FIG. 8. In various embodiments, the iteration information may be retrieved and/or received as part of the determination in determination block 908 in a manner similar to the description of optional block 808.

In response to determining that the iteration information is not available for the remaining partition (i.e., determination block 908="No"), the processing device may select a SLIP heuristic for use for next partitioning of the iterations in block 910.

In block 914, the processing device may partition the iterations of the remaining partition into next partitions using the selected SLIP heuristic. In response to determining that the iteration information is available for the remaining partition (i.e., determination block 908="Yes"), the processing device may select a SLIP heuristic for use for next partitioning of the iterations in block 912. In the selection of the SLIP heuristic in block 912, the processing device may select a SLIP heuristic from the uniform SLIP heuristic, the historical SLIP heuristic, the prediction SLIP heuristic, and the tracker SLIP heuristic depending on the available SLIP information, the iteration information, and priorities of the SLIP heuristics as described herein.

In block 914, the processing device may partition the iterations of the remaining partitions into next partitions using the selected SLIP heuristic.

Figure 10:
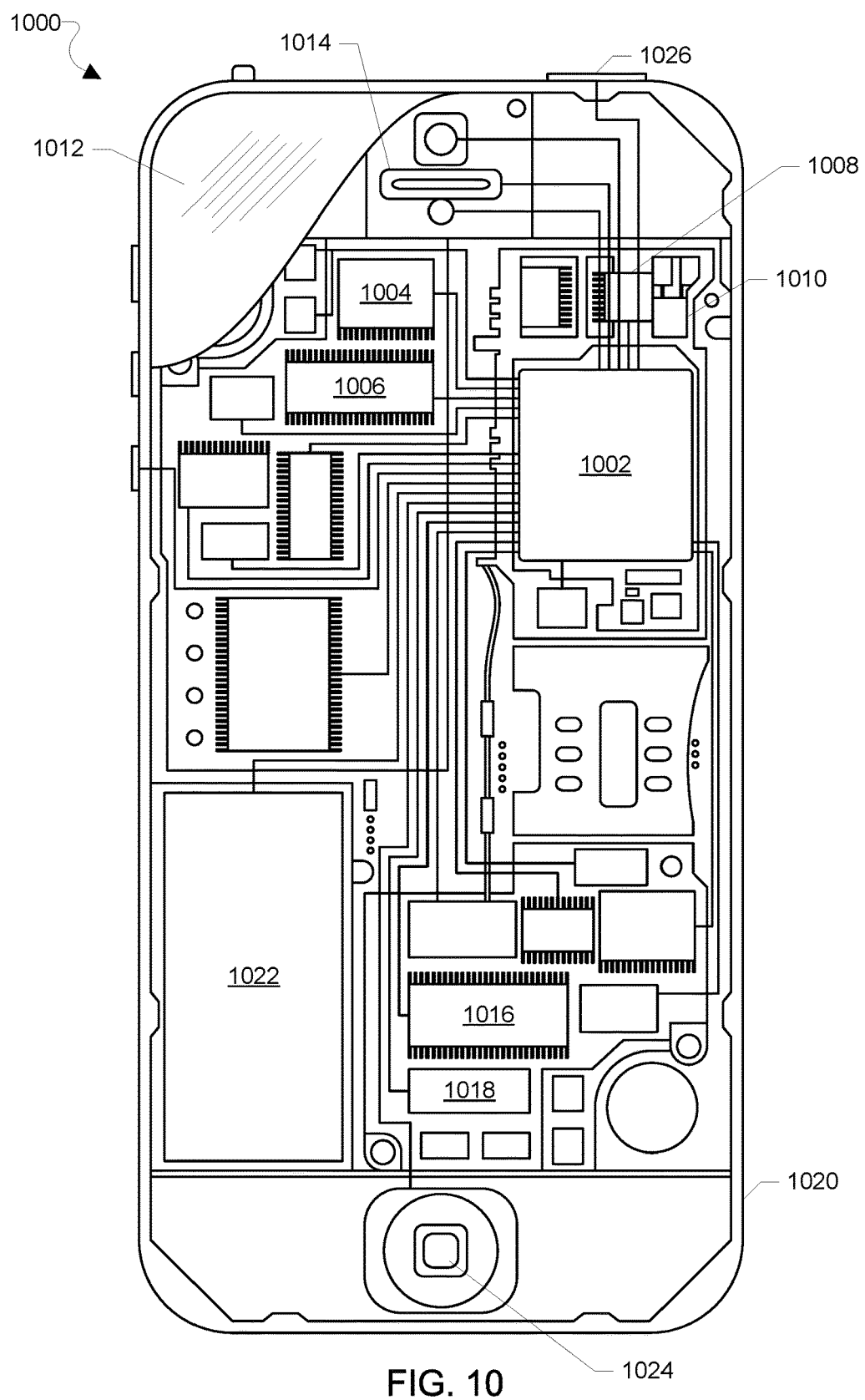
FIG. 10 is component block diagram illustrating an example mobile computing device suitable for use with the various embodiments.

The various embodiments (including, but not limited to, embodiments described above with reference to FIGS. 1-9) may be implemented in a wide variety of computing systems including mobile computing devices, an example of which suitable for use with the various embodiments is illustrated in FIG. 10. The mobile computing device 1000 may include a processor 1002 coupled to a touchscreen controller 1004 and an internal memory 1006. The processor 1002 may be one or more multicore integrated circuits designated for general or specific processing tasks. The internal memory 1006 may be volatile or non-volatile memory, and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 1004 and the processor 1002 may also be coupled to a touchscreen panel 1012, such as a resistive-sensing touchscreen, capacitive-sensing touchscreen, infrared sensing touchscreen, etc. Additionally, the display of the computing device 1000 need not have touch screen capability.

The mobile computing device 1000 may have one or more radio signal transceivers 1008 (e.g., Peanut, Bluetooth, Zigbee, Wi-Fi, RF radio) and antennae 1010, for sending and receiving communications, coupled to each other and/or to the processor 1002. The transceivers 1008 and antennae 1010 may be used with the above-mentioned circuitry to implement the various wireless transmission protocol stacks and interfaces. The mobile computing device 1000 may include a cellular network wireless modem chip 1016 that enables communication via a cellular network and is coupled to the processor.

The mobile computing device 1000 may include a peripheral device connection interface 1018 coupled to the processor 1002. The peripheral device connection interface 1018 may be singularly configured to accept one type of connection, or may be configured to accept various types of physical and communication connections, common or proprietary, such as Universal Serial Bus (USB), FireWire, Thunderbolt, or PCIe. The peripheral device connection interface 1018 may also be coupled to a similarly configured peripheral device connection port (not shown).

The mobile computing device 1000 may also include speakers 1014 for providing audio outputs. The mobile computing device 1000 may also include a housing 1020, constructed of a plastic, metal, or a combination of materials, for containing all or some of the components described herein. The mobile computing device 1000 may include a power source 1022 coupled to the processor 1002, such as a disposable or rechargeable battery. The rechargeable battery may also be coupled to the peripheral device connection port to receive a charging current from a source external to the mobile computing device 1000. The mobile computing device 1000 may also include a physical button 1024 for receiving user inputs. The mobile computing device 1000 may also include a power button 1026 for turning the mobile computing device 1000 on and off.

Figure 11:
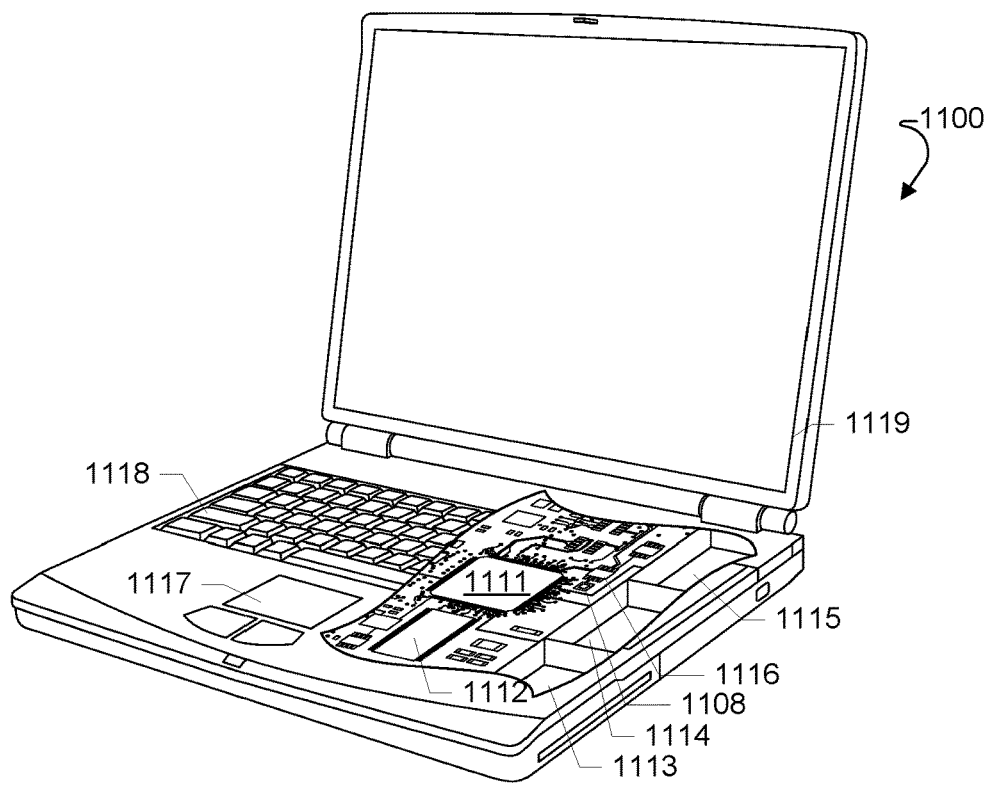
FIG. 11 is component block diagram illustrating an example mobile computing device suitable for use with the various embodiments.

The various embodiments (including, but not limited to, embodiments described above with reference to FIGS. 1-9) may be implemented in a wide variety of computing systems include a laptop computer 1100 an example of which is illustrated in FIG. 11. Many laptop computers include a touchpad touch surface 1117 that serves as the computer's pointing device, and thus may receive drag, scroll, and flick gestures similar to those implemented on computing devices equipped with a touch screen display and described above. A laptop computer 1100 will typically include a processor 1111 coupled to volatile memory 1112 and a large capacity nonvolatile memory, such as a disk drive 1113 of Flash memory. Additionally, the computer 1100 may have one or more antenna 1108 for sending and receiving electromagnetic radiation that may be connected to a wireless data link and/or cellular telephone transceiver 1116 coupled to the processor 1111. The computer 1100 may also include a floppy disc drive 1114 and a compact disc (CD) drive 1115 coupled to the processor 1111. In a notebook configuration, the computer housing includes the touchpad 1117, the keyboard 1118, and the display 1119 all coupled to the processor 1111. Other configurations of the computing device may include a computer mouse or trackball coupled to the processor (e.g., via a USB input) as are well known, which may also be used in conjunction with the various embodiments.

Figure 12:
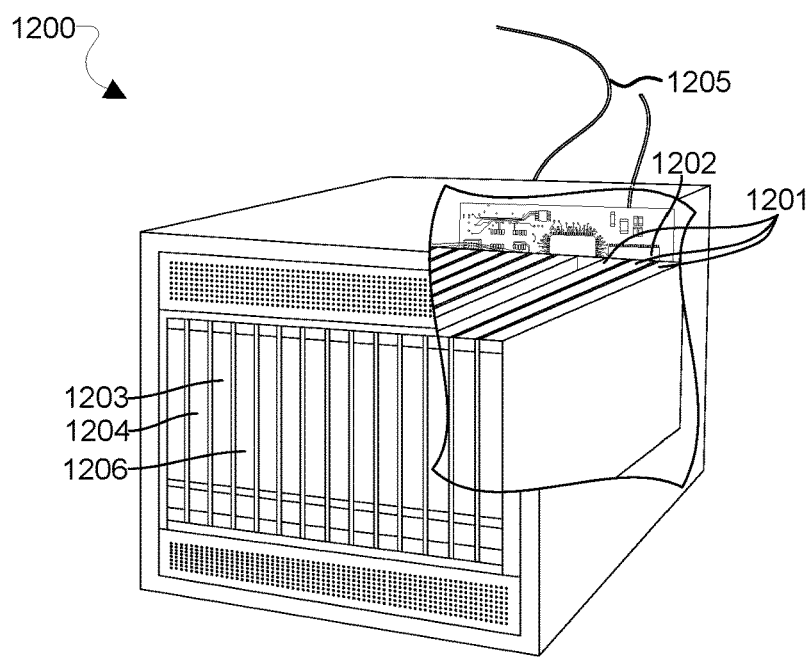
FIG. 12 is component block diagram illustrating an example server suitable for use with the various embodiments.

The various embodiments (including, but not limited to, embodiments described above with reference to FIGS. 1-9) may also be implemented in fixed computing systems, such as any of a variety of commercially available servers. An example server 1200 is illustrated in FIG. 12. Such a server 1200 typically includes one or more multi-core processor assemblies 1201 coupled to volatile memory 1202 and a large capacity nonvolatile memory, such as a disk drive 1204. As illustrated in FIG. 12, multi-core processor assemblies 1201 may be added to the server 1200 by inserting them into the racks of the assembly. The server 1200 may also include a floppy disc drive, compact disc (CD) or digital versatile disc (DVD) disc drive 1206 coupled to the processor 1201. The server 1200 may also include network access ports 1203 coupled to the multi-core processor assemblies 1201 for establishing network interface connections with a network 1205, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

Computer program code or "program code" for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular. The various illustrative logical blocks, modules, circuits, and algorithm operations described in connection with the various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. A method of implementing speculative loop iteration partitioning (SLIP) for heterogeneous processing devices, comprising:
    receiving iteration information for a first partition of iterations of a repetitive process, wherein the iteration information includes information indicating execution progress of the first partition;
    selecting a SLIP heuristic based on available SLIP information and iteration information for the first partition, wherein the available SLIP information include a number of iterations for the first partition and available heterogeneous processing devices;
    determining, using the SLIP heuristic, a split value configured to indicate an iteration at which to partition the first partition based on the iteration information and the available SLIP information;
    partitioning the first partition using the split value to produce a plurality of next partitions; and
    assigning the next partitions to at least a first heterogeneous processing device and a second heterogeneous processing device of the available heterogeneous processing devices for execution.

2. The method of claim 1, further comprising determining whether execution of a second partition of iterations of the repetitive process is complete,
    wherein selecting a SLIP heuristic based on available SLIP information and iteration information for the first partition occurs in response to determining that execution of the second partition is complete.

3. The method of claim 1, further comprising receiving a request for work,
    wherein selecting a SLIP heuristic based on available SLIP information and iteration information for the first partition occurs in response to receiving the request for work.

4. The method of claim 1, wherein:
    receiving iteration information for a first partition of iterations of a repetitive process comprises receiving a current iteration for the first partition; and
    determining a split value comprises determining the split value between the current iteration of the first partition and an unexecuted iteration of the first partition furthest from the current iteration.

5. The method of claim 4, wherein:
    selecting a SLIP heuristic based on available SLIP information and iteration information for the first partition comprises selecting a tracker SLIP heuristic using a modified version of an uniform SLIP heuristic; and
    determining the split value between the current iteration of the first partition and an unexecuted iteration of the first partition furthest from the current iteration comprises determining the split value evenly between the current iteration of the first partition and the unexecuted iteration of the first partition furthest from the current iteration.

6. The method of claim 4, wherein the available SLIP information further includes heterogeneous processing device characteristics, and wherein:
    selecting a SLIP heuristic based on available SLIP information and iteration information for the first partition comprises selecting a tracker SLIP heuristic using a modified version of a prediction SLIP heuristic; and
    determining the split value between the current iteration of the first partition and an unexecuted iteration of the first partition furthest from the current iteration comprises determining the split value between the current iteration of the first partition and the unexecuted iteration of the first partition furthest from the current iteration proportionate to the heterogeneous processing device characteristics of the first heterogeneous processing device and the second heterogeneous processing device relative to each other.

7. The method of claim 4, wherein the available SLIP information further includes partition execution performance data by the first heterogeneous processing device and the second heterogeneous processing device for the repetitive process, and wherein:
    selecting a SLIP heuristic based on available SLIP information and iteration information for the first partition comprises selecting a tracker SLIP heuristic using a modified version of a historical SLIP heuristic; and
    determining the split value between the current iteration of the first partition and an unexecuted iteration of the first partition furthest from the current iteration comprises determining the split value between the current iteration of the first partition and the unexecuted iteration of the first partition furthest from the current iteration proportionate to the partition execution performance data by the first heterogeneous processing device and the second heterogeneous processing device relative to each other.

8. The method of claim 1, wherein:
the plurality of next partitions comprises a first next partition and a second next partition, and
assigning the next partitions to at least a first heterogeneous processing device and a second heterogeneous processing device of the available heterogeneous processing devices for execution comprises assigning the first next partition to the first heterogeneous processing device for execution, wherein the first heterogeneous processing device was previously assigned the first partition,
the method further comprising:
selecting the second heterogeneous processing device in response to one of:
determining that execution of a second partition of iterations of the repetitive process executed by the second heterogeneous processing device is complete;
determining that the second heterogeneous processing device is executing the first partition;
receiving a request for work from the second heterogeneous processing device; or
using available SLIP information relating to the second heterogeneous processing device for selecting the SLIP heuristic based on the available SLIP information and the iteration information for the first partition; and
wherein assigning the next partitions to at least a first heterogeneous processing device and a second heterogeneous processing device of the available heterogeneous processing devices for execution further comprises assigning the second next partition to the second heterogeneous processing device for execution.

9. A speculative loop iteration partitioning (SLIP) controller configured to perform operations comprising:
receiving iteration information for a first partition of iterations of a repetitive process, wherein the iteration information includes information indicating execution progress of the first partition;
selecting a SLIP heuristic based on available SLIP information and iteration information for the first partition, wherein the available SLIP information include a number of iterations for the first partition and available heterogeneous processing devices;
determining, using the SLIP heuristic, a split value configured to indicate an iteration at which to partition the first partition based on the iteration information and the available SLIP information;
partitioning the first partition using the split value to produce a plurality of next partitions; and
assigning the next partitions to at least a first heterogeneous processing device and a second heterogeneous processing device of the available heterogeneous processing devices for execution.

10. The SLIP controller of claim 9, wherein the SLIP controller is configured to perform operations further comprising determining whether execution of a second partition of iterations of the repetitive process is complete,
wherein selecting a SLIP heuristic based on available SLIP information and iteration information for the first partition occurs in response to determining that execution of the second partition is complete.

11. The SLIP controller of claim 9, wherein the SLIP controller is configured to perform operations further comprising receiving a request for work,
wherein selecting a SLIP heuristic based on available SLIP information and iteration information for the first partition occurs in response to receiving the request for work.

12. The SLIP controller of claim 9, wherein the SLIP controller is configured to perform operations such that:
receiving iteration information for a first partition of iterations of a repetitive process comprises receiving a current iteration for the first partition; and
determining a split value comprises determining the split value between the current iteration of the first partition and an unexecuted iteration of the first partition furthest from the current iteration.

13. The SLIP controller of claim 12, wherein the SLIP controller is configured to perform operations such that:
selecting a SLIP heuristic based on available SLIP information and iteration information for the first partition comprises selecting a tracker SLIP heuristic using a modified version of an uniform SLIP heuristic; and
determining the split value between the current iteration of the first partition and an unexecuted iteration of the first partition furthest from the current iteration comprises determining the split value evenly between the current iteration of the first partition and the unexecuted iteration of the first partition furthest from the current iteration.

14. The SLIP controller of claim 12, wherein the available SLIP information further includes heterogeneous processing device characteristics, and wherein the SLIP controller is configured to perform operations such that:
selecting a SLIP heuristic based on available SLIP information and iteration information for the first partition comprises selecting a tracker SLIP heuristic using a modified version of a prediction SLIP heuristic; and
determining the split value between the current iteration of the first partition and an unexecuted iteration of the first partition furthest from the current iteration comprises determining the split value between the current iteration of the first partition and the unexecuted iteration of the first partition furthest from the current iteration proportionate to the heterogeneous processing device characteristics of the first heterogeneous processing device and the second heterogeneous processing device relative to each other.

15. The SLIP controller of claim 12, wherein the available SLIP information further includes partition execution performance data by the first heterogeneous processing device and the second heterogeneous processing device for the repetitive process, and wherein the SLIP controller is configured to perform operations such that:
selecting a SLIP heuristic based on available SLIP information and iteration information for the first partition comprises selecting a tracker SLIP heuristic using a modified version of a historical SLIP heuristic; and
determining the split value between the current iteration of the first partition and an unexecuted iteration of the first partition furthest from the current iteration comprises determining the split value between the current iteration of the first partition and the unexecuted iteration of the first partition furthest from the current iteration proportionate to the partition execution performance data by the first heterogeneous processing device and the second heterogeneous processing device relative to each other.

16. The SLIP controller of claim 9, wherein:
the plurality of next partitions comprises a first next partition and a second next partition, assigning the next partitions to at least a first heterogeneous processing device and a second heterogeneous processing device of the available heterogeneous processing devices for execution comprises assigning the first next partition to the first heterogeneous processing device for execution, wherein the first heterogeneous processing device was previously assigned the first partition, the SLIP controller is configured to perform operations further comprising selecting the second heterogeneous processing device in response to one of:
  determining that execution of a second partition of iterations of the repetitive process executed by the second heterogeneous processing device is complete:
  determining that the second heterogeneous processing device is executing the first partition;
  receiving a request for work from the second heterogeneous processing device; or
  using available SLIP information relating to the second heterogeneous processing device for selecting the SLIP heuristic based on the available SLIP information and the iteration information for the first partition; and assigning the next partitions to at least a first heterogeneous processing device and a second heterogeneous processing device of the available heterogeneous processing devices for execution further comprises assigning the second next partition to the second heterogeneous processing device for execution.

17. A speculative loop iteration partitioning (SLIP) controller, comprising:
  means for receiving iteration information for a first partition of iterations of a repetitive process, wherein the iteration information includes information indicating execution progress of the first partition;
  means for selecting a SLIP heuristic based on available SLIP information and iteration information for the first partition, wherein the available SLIP information include a number of iterations for the first partition and available heterogeneous processing devices;
  means for determining, using the SLIP heuristic, a split value configured to indicate an iteration at which to partition the first partition based on the iteration information and the available SLIP information;
  means for partitioning the first partition using the split value to produce a plurality of next partitions; and
  means for assigning the next partitions to at least a first heterogeneous processing device and a second heterogeneous processing device of the available heterogeneous processing devices for execution.

18. The SLIP controller of claim 17, further comprising means for determining whether execution of a second partition of iterations of the repetitive process is complete,
  wherein means for selecting a SLIP heuristic based on available SLIP information and iteration information for the first partition comprises means for selecting a SLIP heuristic based on available SLIP information and iteration information for the first partition in response to determining that execution of the second partition is complete.

19. The SLIP controller of claim 17, further comprising means for receiving a request for work,
  wherein means for selecting a SLIP heuristic based on available SLIP information and iteration information for the first partition comprises means for selecting a SLIP heuristic based on available SLIP information and iteration information for the first partition in response to receiving the request for work.

20. The SLIP controller of claim 17, wherein:
  means for receiving iteration information for a first partition of iterations of a repetitive process comprises means for receiving a current iteration for the first partition; and
  means for determining a split value comprises means for determining the split value between the current iteration of the first partition and an unexecuted iteration of the first partition furthest from the current iteration.

21. The SLIP controller of claim 20, wherein:
  means for selecting a SLIP heuristic based on available SLIP information and iteration information for the first partition comprises means for selecting a tracker SLIP heuristic using a modified version of an uniform SLIP heuristic; and
  means for determining the split value between the current iteration of the first partition and an unexecuted iteration of the first partition furthest from the current iteration comprises means for determining the split value evenly between the current iteration of the first partition and the unexecuted iteration of the first partition furthest from the current iteration.

22. The SLIP controller of claim 20, wherein the available SLIP information further includes heterogeneous processing device characteristics, and wherein:
  means for selecting a SLIP heuristic based on available SLIP information and iteration information for the first partition comprises means for selecting a tracker SLIP heuristic using a modified version of a prediction SLIP heuristic; and
  means for determining the split value between the current iteration of the first partition and an unexecuted iteration of the first partition furthest from the current iteration comprises means for determining the split value between the current iteration of the first partition and the unexecuted iteration of the first partition furthest from the current iteration proportionate to the heterogeneous processing device characteristics of the first heterogeneous processing device and the second heterogeneous processing device relative to each other.

23. The SLIP controller of claim 20, wherein the available SLIP information further includes partition execution performance data by the first heterogeneous processing device and the second heterogeneous processing device for the repetitive process, and wherein:
  means for selecting a SLIP heuristic based on available SLIP information and iteration information for the first partition comprises means for selecting a tracker SLIP heuristic using a modified version of a historical SLIP heuristic; and
  means for determining the split value between the current iteration of the first partition and an unexecuted iteration of the first partition furthest from the current iteration comprises means for determining the split value between the current iteration of the first partition and the unexecuted iteration of the first partition furthest from the current iteration proportionate to the partition execution performance data by the first heterogeneous processing device and the second heterogeneous processing device relative to each other.

24. The SLIP controller of claim 17, wherein:
  the plurality of next partitions comprises a first next partition and a second next partition, and
  means for assigning the next partitions to at least a first heterogeneous processing device and a second heterogeneous processing device of the available heterogeneous processing devices for execution comprises means for assigning the first next partition to the first heterogeneous processing device for execution, wherein the first heterogeneous processing device was previously assigned the first partition, the SLIP controller further comprising means for selecting the second heterogeneous processing device in response to one of:
- determining that execution of a second partition of iterations of the repetitive process executed by the second heterogeneous processing device is complete;
- determining that the second heterogeneous processing device is executing the first partition;
- receiving a request for work from the second heterogeneous processing device; or
- using available SLIP information relating to the second heterogeneous processing device for selecting the SLIP heuristic based on the available SLIP information and the iteration information for the first partition; and wherein means for assigning the next partitions to at least a first heterogeneous processing device and a second heterogeneous processing device of the available heterogeneous processing devices for execution further comprises means for assigning the second next partition to the second heterogeneous processing device for execution.

25. A non-transitory processor-readable storage medium having stored thereon processor-executable instructions configured to cause a processor of a computing device to perform operations comprising:
- receiving iteration information for a first partition of iterations of a repetitive process, wherein the iteration information includes information indicating execution progress of the first partition;
- selecting a speculative loop iteration partitioning (SLIP) heuristic based on available SLIP information and iteration information for the first partition, wherein the available SLIP information include a number of iterations for the first partition and available heterogeneous processing devices;
- determining, using the SLIP heuristic, a split value configured to indicate an iteration at which to partition the first partition based the iteration information and the available SLIP information;
- partitioning the first partition using the split value to produce a plurality of next partitions; and
- assigning the next partitions to at least a first heterogeneous processing device and a second heterogeneous processing device of the available heterogeneous processing devices for execution.

26. The non-transitory processor-readable storage medium of claim 25, wherein the stored processor-executable instructions are configured to cause the processor to perform operations further comprising determining whether execution of a second partition of iterations of the repetitive process is complete,
wherein selecting a SLIP heuristic based on available SLIP information and iteration information for the first partition occurs in response to determining that execution of the second partition is complete.

27. The non-transitory processor-readable storage medium of claim 25, wherein the stored processor-executable instructions are configured to cause the processor to perform operations further comprising receiving a request for work,
wherein selecting a SLIP heuristic based on available SLIP information and iteration information for the first partition occurs in response to receiving the request for work.

28. The non-transitory processor-readable storage medium of claim 25, wherein the stored processor-executable instructions are configured to cause the processor to perform operations such that:
- receiving iteration information for a first partition of iterations of a repetitive process comprises receiving a current iteration for the first partition; and
- determining a split value comprises determining the split value between the current iteration of the first partition and an unexecuted iteration of the first partition furthest from the current iteration.

29. The non-transitory processor-readable storage medium of claim 28, wherein the stored processor-executable instructions are configured to cause the processor to perform operations such that:
- selecting a SLIP heuristic based on available SLIP information and iteration information for the first partition comprises selecting a tracker SLIP heuristic using a modified version of an uniform SLIP heuristic; and
- determining the split value between the current iteration of the first partition and an unexecuted iteration of the first partition furthest from the current iteration comprises determining the split value evenly between the current iteration of the first partition and the unexecuted iteration of the first partition furthest from the current iteration.

30. The non-transitory processor-readable storage medium of claim 28, wherein the available SLIP information further includes heterogeneous processing device characteristics, and wherein the stored processor-executable instructions are configured to cause the processor to perform operations such that:
- selecting a SLIP heuristic based on available SLIP information and iteration information for the first partition comprises selecting a tracker SLIP heuristic using a modified version of a prediction SLIP heuristic; and
- determining the split value between the current iteration of the first partition and an unexecuted iteration of the first partition furthest from the current iteration comprises determining the split value between the current iteration of the first partition and the unexecuted iteration of the first partition furthest from the current iteration proportionate to the heterogeneous processing device characteristics of the first heterogeneous processing device and the second heterogeneous processing device relative to each other.

* * * * *